(12) United States Patent
Cox et al.

(10) Patent No.: US 11,870,547 B2
(45) Date of Patent: *Jan. 9, 2024

(54) METHOD AND APPARATUS FOR ENHANCED PLAYBACK OF CONTENT WHILE SWITCHING AMONG CHANNELS OF BROADCAST OR STREAMED CONTENT WHILE BEING RECEIVED (TUNE START)

(71) Applicant: Sirius XM Radio Inc., New York, NY (US)

(72) Inventors: Stuart Anderson Cox, Boca Raton, FL (US); Paul D. Marko, Sunrise, FL (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,190

(22) Filed: Apr. 11, 2022

(65) Prior Publication Data

US 2023/0070871 A1    Mar. 9, 2023

Related U.S. Application Data

(63) Continuation of application No. 16/397,602, filed on Apr. 29, 2019, now Pat. No. 11,303,370, which is a
(Continued)

(51) Int. Cl.
*H04H 20/55*    (2008.01)
*H04N 5/775*    (2006.01)
(Continued)

(52) U.S. Cl.
CPC ............ *H04H 20/55* (2013.01); *H04H 20/26* (2013.01); *H04H 20/74* (2013.01); *H04H 60/27* (2013.01);
(Continued)

(58) Field of Classification Search
CPC ...... H04N 9/8205; H04N 5/907; H04N 5/775; H04N 21/4383; H04N 21/8113;
(Continued)

(56) References Cited

U.S. PATENT DOCUMENTS 5,506,628 A * 4/1996 Chun ..................... H04N 5/45
                                                              348/588
9,154,248 B2 * 10/2015 Cox ...................... H04H 20/55
(Continued)

*Primary Examiner* — Jinsong Hu
*Assistant Examiner* — Rui M Hu
(74) *Attorney, Agent, or Firm* — Kramer Levin Naftalis & Frankel LLP

(57) ABSTRACT

A system and method provide an enhanced listening experience for a user of a radio receiver or other device that receives broadcast or streamed content having a plurality of program channels. The method and system buffer designated channels at the receiver and, when switching among channels, play back the buffered designated channels during reception from a selected point therein depending on the channel or other criteria. When switching to a different channel during reception, a user is able to hear content in a buffered program channel with music from the start of a song, for example, whereas content in a channel with news, talk radio, or live sports is played back from live reception, even though the content segments are transmitted at different start times relative to their selected times for playback following a channel change. User controls allow navigation among buffered designated channels during reception.

14 Claims, 8 Drawing Sheets

Related U.S. Application Data continuation of application No. 14/868,659, filed on Sep. 29, 2015, now Pat. No. 10,277,342, which is a continuation of application No. 13/982,949, filed as application No. PCT/US2012/025091 on Feb. 14, 2012, now Pat. No. 9,154,248.

(60) Provisional application No. 61/442,468, filed on Feb. 14, 2011.

(51) Int. Cl.
| | |
|---|---|
| *H04N 5/907* | (2006.01) |
| *H04N 9/82* | (2006.01) |
| *H04H 20/26* | (2008.01) |
| *H04N 21/438* | (2011.01) |
| *H04N 21/439* | (2011.01) |
| *H04N 21/81* | (2011.01) |
| *H04N 21/845* | (2011.01) |
| *H04H 60/27* | (2008.01) |
| *H04H 20/74* | (2008.01) |

(52) U.S. Cl.
CPC ............. *H04N 5/775* (2013.01); *H04N 5/907* (2013.01); *H04N 9/8205* (2013.01); *H04N 21/4383* (2013.01); *H04N 21/4392* (2013.01); *H04N 21/8113* (2013.01); *H04N 21/8456* (2013.01)

(58) Field of Classification Search
CPC ........... H04N 21/4392; H04N 21/8456; H04H 60/27; H04H 20/74; H04H 20/55; H04H 20/26
See application file for complete search history.

(56) References Cited

U.S. PATENT DOCUMENTS

| | | | |
|---|---|---|---|
| 9,600,573 B2* | 3/2017 | Marko | H04H 60/46 |
| 10,277,342 B2* | 4/2019 | Cox | H04N 9/8205 |
| 11,303,370 B2* | 4/2022 | Cox | H04N 21/8456 |
| 2004/0148555 A1* | 7/2004 | Blackburn | H04N 21/812 |
| | | | 348/E5.005 |
| 2008/0152039 A1* | 6/2008 | Shah | H04H 20/33 |
| | | | 375/316 |
| 2009/0165062 A1* | 6/2009 | Harris | H04N 21/44222 |
| | | | 725/87 |

* cited by examiner

| ARTIST/SONG LABEL | BIC TYPE = 4 | R F U | SEQ. NUMBER | SID REF | DURATION/ PROGRESS FORMAT | R F U | PROGRAM ID | DURATION INDICATOR VALID | PROGRESS INDICATOR VALID | EL REF | # OF MASKS | DISPLAY SIZE 1 | DISPLAY SIZE 2 | ARTIST DISPLAY MASK 1 | ARTIST DISPLAY MASK 2 | ARTIST LABEL | SONG DISPLAY MASK 1 | SONG DISPLAY MASK 2 | SONG LABEL |
|---|---|---|---|---|---|---|---|---|---|---|---|---|---|---|---|---|---|---|---|
| | 5 | 1 | 2 | 8 | 4 | 2 | 1 | 16 | 16 | 6 | 2 | 4 | 4 | 16 | 16 | 128 | 16 | 16 | 128 |

METHOD AND APPARATUS FOR ENHANCED PLAYBACK OF CONTENT WHILE SWITCHING AMONG CHANNELS OF BROADCAST OR STREAMED CONTENT WHILE BEING RECEIVED (TUNE START)

The entire contents of U.S. provisional application Ser. No. 61/442,468, filed Feb. 14, 2011, are incorporated herein by reference. Related subject matter is disclosed and claimed in U.S. Pat. Nos. 6,154,452, 6,229,824, and 7,809,326, the entire contents of which are hereby incorporated by reference. Reference is also made to commonly owned U.S. Patent Application Publication No. 2009/0320075, the entire contents of which are also incorporated herein by reference

BACKGROUND OF THE INVENTION

Field of the Invention

The present invention relates generally to an operation (e.g., hereinafter referred to as "Tune Start™") of a broadcast or streamed content receiver that buffers content for a number of channels (e.g., preset channels or favorite channels) so that selecting one of these channels during real-time reception of the content allows the user to hear a currently or recently aired track (e.g., song, news segment, talk segment, and the like) on the selected channel from its beginning, instead of from the current real-time broadcast position which is typically in the midst of the track.

Description of the Related Art

In a radio receiver or other device capable of receiving multiple broadcast or streamed content channels, each channel can be modeled as a series of tracks. Since the content of the respective channels in broadcast or streamed content transmissions is programmed and then broadcast or streamed independently of other channels, the start and end of tracks on different channels are not synchronized in time. For example, the start of a song track on one channel can correspond to the middle of a song or news track on other channels. The boundary between the end of a talk radio track and start of an advertisement on one channel can correspond to the middle of a news track or song on other channels, since there is no intentional relationship between tracks on different channels in either content or timing.

In a typical use of a radio receiver capable of receiving multiple channels, a user may assign favorite channels to a set of preset channels, so a particular favorite channel can be quickly selected for live play by simply selecting a Preset button on the radio receiver that was previously assigned to the favorite channel. Often while listening to a channel ("current channel") live, that is, while the broadcast channel is being received, the user may decide to sample the content on one of his favorite channels to determine if is something more interesting on that favorite channel. For example, the current channel might be playing a song that the user is not interested in hearing, an advertisement on a news channel, disk jockey (DJ) banter, or a talk radio segment about a topic the user has no interest in. When selecting one of the other favorite channels via a Preset button, in most cases this selected channel ("new channel") will be playing in the middle of a track (e.g. song, talk segment, advertisement, etc.). Although the new channel content may be of higher interest to the user than the current channel, the user almost invariably misses the beginning of the song or news/talk track playing on the new channel. As the user successively punches several Preset buttons looking for interesting content, he ultimately ends up listening to the "ends" of songs and news/talk tracks, particularly if he repeats the content search process at the end of each track.

SUMMARY OF THE INVENTION

In accordance with illustrative embodiments of the present invention, a significant improvement to the user experience is realized by a radio receiver or other user device that buffers content on each of plural channels (e.g., favorite, preset channels, another subset of all available channels, or all available channels), so that selecting a favorite or other designated channel results in the start of play at the beginning of a track (e.g., song, news/talk segment, etc.) or other selected playback point within the track broadcast or otherwise transmitted on that channel. The user who is surfing (e.g., scanning or switching) between channels can therefore listen to the most interesting track, from its start if preferred over the live reception point, of all content currently playing on the designated channels (e.g., Smart Favorite™ channels).

Illustrative embodiments of the present invention also provide the user with the ability to skip backwards in time through the buffered content of a recently selected Smart Favorite™ channel, so that content such as the start of a news segment or previously aired songs on that channel could be played from the start, even though this content was originally aired while the user was listening to a different channel. Skip forward and other navigation controls are also provided.

Illustrative embodiments of the present invention also provide the user with the ability to initiate a content scanning operation whereby tracks (e.g., songs, news/talk segments, etc.) previously aired and buffered for a plurality of designated channels are played in succession from the start for a few seconds for each track (or optionally live for certain designated channels), until the user halts the scanning and continues to enjoy the full track on which the user stopped the scan.

BRIEF DESCRIPTION OF THE DRAWINGS illustrative embodiments of the present invention will be more readily understood with reference to the illustrative embodiments thereof illustrated in the attached drawing figures, in which:

FIG. 3 depicts an example of ancillary information provided with broadcast or streamed content in accordance with an illustrative embodiment of the present invention.

DETAILED DESCRIPTION OF ILLUSTRATIVE EMBODIMENTS

Figure 1:
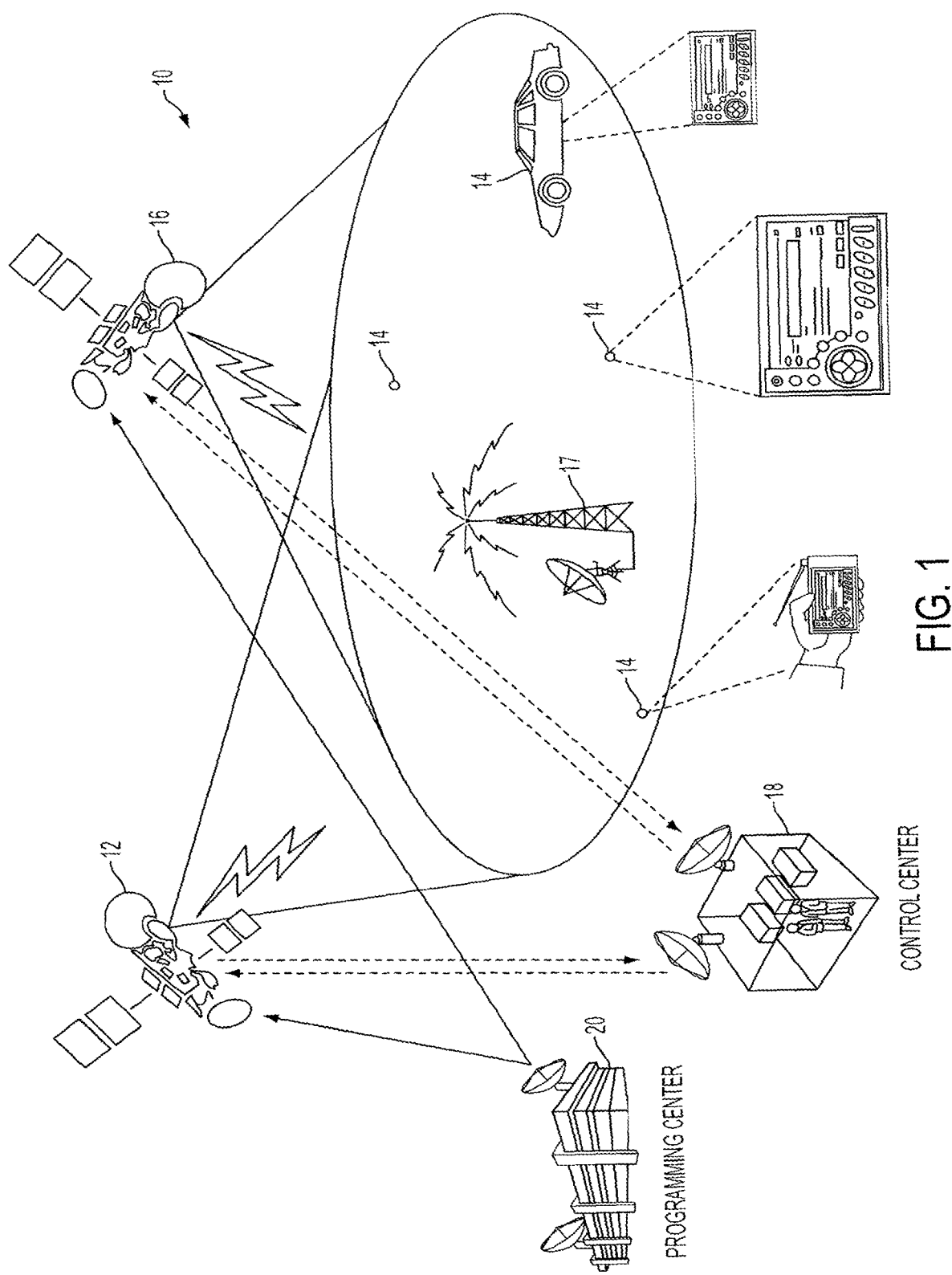
FIG. 1 depicts an example of a broadcast or streamed content delivery system in accordance with an illustrative embodiment of the present invention.

Several illustrative embodiments of the present invention are described herein. Briefly, a radio receiver or other user device is configured for Tune Start™ operation that enables it to receive at least one broadcast stream or streamed content (e.g., metadata, audio, and/or video) that comprises a plurality of different content channels. The radio receiver or user device designates multiple channels from among the plurality of broadcast or streamed channels and buffers content from the designated or otherwise selected channels as they are being received via the received stream. Multiple channels can be received and buffered simultaneously. The buffered content is used to allow a user to switch between channels during a live listening mode (i.e., listening to content in a broadcast or streamed content stream as it is being received) and is to be distinguished from receivers that buffer content for a subsequent or deferred playback mode (e.g., listening to previously received and stored content at another time such as when a transmitted signal is not available or simply when deferred playback is desired by the user).

The Tune Start™ operation avoids limitations of services and products that seek to fully automate personalized selection of played content, such as music genome-based services that may work well enough for music-only content but are deficient when selecting other types of content fragments such as news, talk, and sports to playback that are difficult to classify. The Tune Start™ operation avoids the disadvantages of existing products and services that attempt "full automation" of personalized content selection, affording the user a high level of control over content selection (in contrast to automated services), while insuring each segment of selected content can be enjoyed in full (in contrast to traditional preset radio channel surfing). "Segment" or "track" hereinafter refers to a portion of content typically corresponding to one song on a music channel, an uninterrupted segment of news reporting or talk radio content, or uninterrupted segment of a sports event broadcast, a single commercial advertisement, a segment of DJ banter or station identification between songs, among other continuous segments of content. "Uninterrupted" in this context means continuous audio content that is not interrupted by a different content type such as an advertisement, DJ banter, station identification, and so on. Thus, the Tune Start™ operation provides an optimal balance of automation and user control, which is a particularly useful functionality for products that feature a wide variety of music, talk, news, and sports content. The content can be received from one or more streams and from diverse sources. In an illustrative example of Satellite Digital Audio Radio Service or SDARS or similar programming service, Tune Start™ makes radio receivers, user devices and other products increasingly attractive to consumers, while also leveraging additional commercial value from a unique broadcast pipe of diverse curated content such as SDARS.

A Smart Favorite™ channel is a channel designated for maintenance by a user device in a Background Instant Replay (IR) Buffer. Smart Favorite™ channels support Tune Start™ and Tune Scan™ operations described in more detail below. When selecting a Smart Favorite™ channel, the radio receiver or user device can start playing the currently aired track (e.g., song, news segment, talk segment, etc.) from the channel at the beginning of the track, instead of from the current real-time or live position due to it having been buffered in the BIR buffer. This capability of Smart Favorite™ channels is called Tune Start™. Alternatively, a Smart Favorite™ channel can be tuned to live content (e.g., based on content type, channel type, user selection, or other criterion). Regardless of whether the selected Smart Favorite™ channel plays live content or from a buffered track, after tuning the user can manually skip back to the start of a track within its buffer, which may hold a plurality of tracks depending on the track durations and the capacity of the channel's buffer.

Overview of Illustrative System Architecture

The illustrative embodiments of the present invention are described herein with respect to a satellite digital audio radio service (SDARS) that is transmitted to the receivers by one or more satellites and/or terrestrial repeaters. It is to be understood that the source content stream(s) used to achieve a Tune Start™ operation in accordance with the present invention can be broadcast, streamed or otherwise transmitted using other content delivery systems (e.g., other digital audio broadcast (DAB) systems or high definition (HD) radio systems, or two-way Internet Protocol (IP) system), as well as other wireless or wired methods for signal transmission. Further, it is to be understood that the source content stream(s) used to achieve a Tune Start™ operation in accordance with the present invention can be received by user devices other than radio receivers that are capable of receiving broadcast or streamed content having multiple channels. In addition, it is to be understood that the relationships of tracks or content segments on different channels can be independent (e.g., asynchronous with respect to each other in terms of transmission timing) and/or unrelated and their respective timing and program content need not be known by the user device to perform a channel change.

FIG. 1 depicts an illustrative system for transmitting at least one exemplary source stream to radio receivers 14. In the illustrative embodiment, the source stream provides SDARS. FIG. 1 depicts a satellite broadcast system 10 which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and that satellites in other types of orbits can be used.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of payload channels and auxiliary information.

With reference to FIG. 1, the programming center 20 is configured to obtain content from different information sources and providers and to provide the content to corresponding encoders. The content can comprise both analog and digital information such as audio, video, data, program label information, auxiliary information, and so on. For example, the programming center 20 can provide SDARS having on the order of 100 different audio program channels to transmit different types of music programs (e.g., jazz, classical, rock, religious, country, and so on) and news programs (e.g., regional, national, political, financial, sports). The SDARS can also provide emergency information, travel advisory information, educational programs, and the like.

Figure 2:
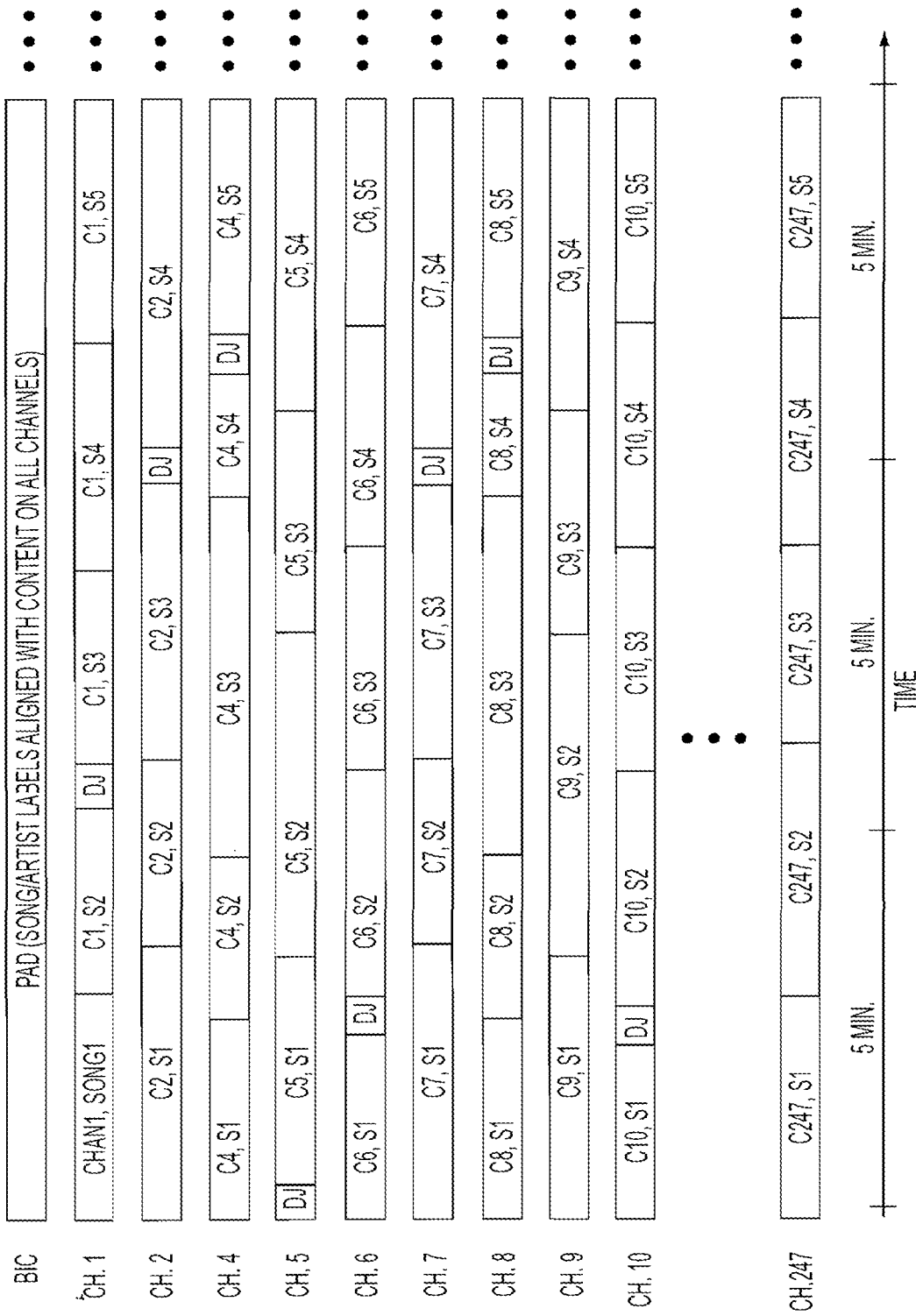
FIG. 2 depicts broadcast or streamed content having a plurality of channels in accordance with an illustrative embodiment of the present invention, and a central office.

FIG. 2 illustrates different service transmission channels (e.g., Ch. 1 through Ch. 247) providing the payload content and a Broadcast Information Channel (BIC) providing the auxiliary information. These channels are multiplexed and transmitted in a composite data stream that can be a source stream for a radio receiver 14 constructed in accordance with exemplary embodiments of the present invention. The illustrated payload channels comprise segments such as songs indicated, for example, as S1, S2, S3 and so on) and disc jockey (DJ) talk segments indicated as "dj" in FIG. 2. The BIC can comprise, for example, messages 71 that correspond to different payload channels. An exemplary message 71 comprising Program Associated Data (PAD) is depicted in FIG. 3. The messages 71 can have different formats and functions than that depicted in FIG. 3. Further, the timing of messages 71 in relation to a particular channel can vary according to the needs of the service provider and to bandwidth requirements. In other words, a message 71 need not be provided for all of the respective channels in every transmitted frame of the content stream.

The BIC includes auxiliary information useful for services selection and non-real-time control. For example, the auxiliary information comprises data (e.g., Program Associated Data or PAD) to facilitate locating the beginnings of songs or other tracks (e.g., for playback from their respective beginnings when their corresponding channels are selected during a live broadcast or content delivery mode). The auxiliary information in the composite data stream (e.g., PAD) also allows a multi-channel demultiplexer in the receiver 14 to locate and buffer the selected channels, as well as optionally locating and buffering favorite songs from other non-selected channels. The auxiliary information that relates music genres, channels and songs/artists in an SDARS is also a readily available tool with which to navigate the buffered diverse content provided via SDARS or other content delivery service (e.g., two-way IP) for achieving a convenient and personalized listening experience. Thus, the present invention is characterized by the additional advantages of leveraging this auxiliary information, which is already available in an SDARS composite data stream, for additional beneficial uses.

The BIC can be used to display the station name of available services, a directory to the contents of the composite data stream, as well as PAD. By way of an example, the illustrative PAD in FIG. 3 can comprise data associated with a channel such as a song name or label, artist name or label, service ID (SID), and program ID (PID), among other data. The service ID is an identifier (typically 8 bits) which is associated with a specific SDARS provider radio service (e.g., for Sirius XM Radio, the SID can identify service channels such as Classic Rewind, CNN News, The Comedy Channel, and the like) and is used identify the specific service channel at the receivers 14. The program ID comprises data relating to the identity of a unique content segment such as a song on a specific CD, for example, and can comprise data relating to the duration and progress of a song or other track. Thus, a change in PID and/or PAD can indicate to a receiver 14 the beginning of a song or track for that channel and facilitate buffering of the song (e.g., for a LIVE mode Tune Start™ operation in accordance with an embodiment of the present invention, or for a personalized radio channel operation for use during a playback mode such as a MY RADIO mode whereby content can be recorded to non-volatile memory for later playback when the radio receiver or user device 14 is out of signal or otherwise when the user wants to hear content from the non-volatile memory).

The present invention is advantageous since the channels are partitioned into segments, and the beginnings of segments in the multiple selected channels are located for buffering to implement the Tune Start™ operation. Thus, complete segments or songs are buffered for playback on multiple, simultaneously received channels that have been selected (e.g., as preset channels, or favorite channels, or otherwise selected channels related in some manner to be of interest to the user, or all channels). This is in contrast with channel selection or scanning operations on conventional radio receivers that often bring a listener to the middle or near end of a song that had not been buffered. As stated above, a channel that is designated for buffering to support the Tune Start™ operation and optionally a Tune Scan™ operation (e.g., a Smart Favorite™ channel).

Figure 4:
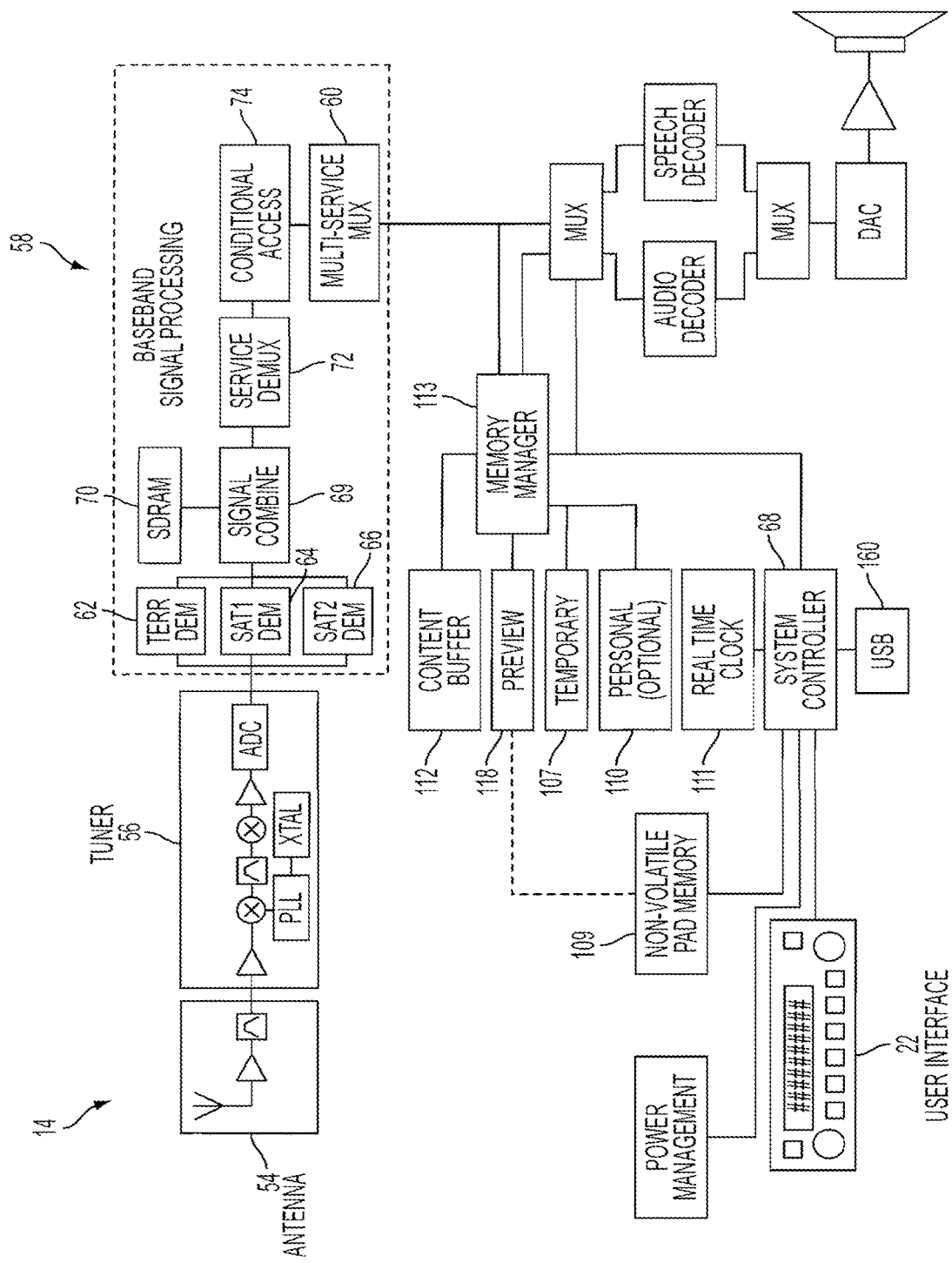
FIG. 4 depicts a radio receiver or other user device configured to receive broadcast or streamed content in accordance with an illustrative embodiment of the present invention.

An exemplary receiver 14 is depicted in FIG. 4. The radio receiver 14 preferably comprises an antenna 54 for receiving, for example, an SDARS signal and/or other broadcast or otherwise transmitted streams, a tuner 56, baseband signal processing components indicated generally at 58, a system controller 68, a multi-service multiplexer MUX 60 and memory, among other components. As stated above, illustrative embodiments of the present invention can be implemented in other types of user devices that can receive content (e.g., metadata and/or audio and/or video delivered by broadcast or streaming) such as mobile telephones, personal computers, personal data assistants, portable computing devices, different types of receivers, and so on.

With further reference to FIG. 4, the receiver 14 preferably comprises three receiver arms for processing the SDARS broadcast stream received from two satellites 12, 16 and a terrestrial repeater 17, as indicated by the demodulators 62, 64, 66, that are demodulated, combined and decoded via the signal combiner 69 in combination with the SDRAM 70, and demultiplexed to recover channels from the SDARS broadcast stream, as indicated by the signal combining module 69 and service demultiplexer module 72. Processing of a received SDARS broadcast stream is described in further detail in commonly owned U.S. Pat. Nos. 6,154,452 and 6,229,824, the entire contents of which are hereby incorporated herein by reference. A conditional access module 74 can optionally be provided to restrict access to certain demultiplexed channels. For example, each receiver 14 in an SDARS system can be provided with a unique identifier allowing for the capability of individually addressing each receiver 14 over-the-air to facilitate conditional access such as enabling or disabling services, or providing custom applications such as individual data services or group data services. The demultiplexed service data stream is provided to the system controller 68 from a multi-service multiplexer 60.

In accordance with an embodiment of the present invention, the radio receiver 14 is provided with a memory or a part of a memory that is managed by firmware, for example, to support storing content from multiple channels that have been broadcast, streamed or otherwise transmitted for buffering the selected received and demultiplexed Smart Favorite™ channels of the currently active Tune Start™ channel configuration. Reference is made to commonly owned U.S.

Pat. No. 7,809,326 and U.S. Patent Application Publication No. 2009/0320075, the entire contents of which are hereby incorporated herein by reference, for storage of received broadcast or streamed content at a user device.

For illustrative purposes, a radio receiver 14 is shown that can have a Temporary memory 107, Preview memory 118, and a Personal memory 110, as depicted in FIG. 4. It is to be understood that devices implementing the Tune Start™ operation in accordance with illustrative embodiments of the present invention need not have the memory allocation depicted in FIG. 4 (e.g., Temporary memory 107, Preview memory 118, and a Personal memory 110) but rather can comprise a memory or at least part of a memory (hereinafter generally referred to as "content buffer" 112) that is managed to buffer the selected received and demultiplexed channels of the currently active Tune Start™ channel configuration. Further, devices implementing the Tune Start™ operation in accordance with illustrative embodiments of the present invention need not operate in a MY RADIO mode as described below. For example, these devices can be configured to only have a LIVE mode whereby content is stored, for example, only to volatile memory for play back substantially as it is being received.

In accordance with an illustrative embodiment of the present invention, the content buffer 112 comprises a Background Instant Replay (BIR) buffer used to buffer Smart Favorite™ channel content, and a Foreground Instant Replay (FIR) buffer used to buffer the currently selected channel. More specifically, in accordance with the Instant Replay (IR) operation, a radio receiver or other user device buffers the audio content of the currently tuned channel in the FIR buffer (e.g., a FIFO RAM buffer) so that the audio of the channel can be paused/resumed, skipped by track forward and backward, and rewound and fast-forwarded. IR navigation capabilities can be restricted on a channel basis, through configuration data provided in a broadcast data service. For example, for music channels, the number of rewind and forward skips can optionally be limited to 1 and 5, respectively, for each channel per hour. In one illustrative embodiment, the FIR buffer is the main IR buffer used for the channel currently tuned by the user and is to be distinguished from the BIR buffers used to accumulate content for un-tuned Smart Favorite™ channels.

With continued reference to FIG. 4, a Temporary memory 107, preferably volatile memory, can be used by the receiver 14 to store content that will not be stored beyond the user's current listening session (i.e., unlike content stored for use during Playback mode). Preview memory 118, preferably non-volatile memory, can be configured into partitions of several tracks by the user as well as still being accessible to the receiver 14 for Record and autorecord modes. Personal Memory 110 receives data transferred for permanent storage, or until the user deletes the data. Personal Memory 110 may either be fixed or removable. Personal memory 110 is preferably Flash memory or a hard drive. In one embodiment according to the present invention, the data cannot be transferred from fixed personal memory 110.

Exemplary embodiments of the different implementations of memory in the instant invention can include two modes: LIVE mode and MY RADIO mode. In the LIVE mode, the user is listening to one of the plurality of channels of the broadcast content stream in real-time or as it is being received. The Temporary memory 107 will buffer at least the content from the channel to which the receiver is currently tuned. As described below, the receiver 14 also buffers content from selected plural channels (e.g., Smart Favorite™ channels) to implement a Tune Start™ operation in accordance with the present invention. In MY RADIO mode, user is listening to content from the broadcast stream that was previously received and stored and the user's radio receiver is no longer in the LIVE mode. For example, a user may select MY RADIO mode when the radio receiver is incapable of receiving the broadcast stream (e.g., due to signal loss) or wishes to hear content that the user has selected for playback and is not available when the user's radio receiver is in LIVE mode.

In the illustrated embodiment of FIG. 2, the receiver 14 may have volatile memory, as its Temporary memory 107, in which content may be temporarily buffered. The volatile memory will preferably be erased whenever the device is powered off. The volatile memory preferably buffers live broadcast content as the user listens to it, which allows for the Instant Replay (IR) operation, and the Tune Start™ operation in accordance with illustrative embodiment of the present invention. As stated above, any configuration of memory can be used for the implementation of the Tune Start™ operation, and is generally referred to as the content buffer 112.

As stated above, the Instant Replay operation allows the user, while listening to a live broadcast, to control content that they have already listened to in the LIVE mode. Thus, the user is able to pause, rewind, and fast forward back to the real-time broadcast. The user can also skip through tracks stored in the volatile memory based on the PAD data stored along with the content. This allows the user, while listening live broadcast or streamed content, to stop and replay a certain lyric or answer to a question that they may not have understood or that they had liked, without missing the rest of the song or interview. The Replay function then allows the user to continue listening to the buffered content or the user can "fast forward" to the end of the buffer to catch up with the live content. The memory used for the Replay function is preferably volatile memory, but could be implemented using any suitable memory technology.

As an example, Smart Favorite™ channels each have their content constantly buffered in a FIFO RAM buffer employed as the Background Instant Replay (BIR) Buffer (e.g., with a capacity of around 10 to 60 minutes for each Smart Favorite™ channel depending on product RAM resources and cost targets). Once a Smart Favorite™ channel is selected for play, the Smart Favorite™ BIR Buffer content can be copied into the radio's Foreground Instant Replay (FIR) Buffer, replacing its contents and effectively seeding it with historical content for further radio and user manipulation. It is to be understood that copying need not be implemented as an actual memory copy but can instead involve pointer management and other methods.

The Tune Start™ operation is described in further detail below in connection with FIGS. 6-14 in accordance with illustrative embodiment of the present invention.

The Temporary memory 107 can also supports a "Buy" feature if provided by the user device 14. For example, a user is able to press a "Buy" button while they are listening to live or temporarily buffered content. The receiver or user device 14, in turn, responds to the user selection to enable a purchase of the selected content if it is configured for the "Buy" feature.

The radio receiver 14 can also contain a Preview memory such as a non-volatile limited control memory that performs a number of functions. For example, the non-volatile limited control memory can perform an "auto-record" function to store broadcast content, and periodically update the non-volatile limited control memory with fresh broadcast content. The non-volatile limited control memory preferably is sufficient to store several hours of time-shifted content. In this manner, the user has several hours of fresh broadcast content available in situations when a live signal is not available. The time-shifted content contains PAD data and content data, so that the "buy" function can be performed by the user during playback.

If the user decides to buy a segment of the broadcast content, the content and or content-related information can be stored in the personal memory for later use in purchasing the content. The segment may be a song, interview, recital, video, or other media. Alternatively, if the user may want to record the content for later enjoyment, the content can be stored in preview memory 118 or personal memory 110 depending upon the user settings for the particular device 100.

In MY RADIO mode, the user is listening to the stored content from either temporary memory 107 or personal memory 110. Preview memory 118 may have time-shifted content stored thereon for the user to enjoy or the time-shifted content may be stored in personal memory 110. The personal memory 110 may be a removable memory, such as Flash, on which the user has stored his favorite songs or interviews. The personal memory is preferably a flash memory, but of course any suitable memory device, including hard drives, non-volatile IC type memory, and so on. Alternatively, personal memory can be fixed memory that is accessible via a personal computer or similar device.

It is to be understood that the user (e.g., via a user interface), or the radio receiver 14 or other user device (e.g., automatically), can partition the volatile, nonvolatile, or personal memories into partitions of memory. The size of the partition is based upon the number of tracks and the overall size of the memory. Additionally, the above memories can be formed in a single memory in a device and merely managed as if they were Temporary 107, Preview 118, or Personal 110 memories. Alternatively, the Temporary 107, Preview 118, and Personal 110 memories can be separate memories in a radio receiver 14 or in a combination of devices (a personal computer and radio receiver 14 in a dock sharing personal memory). Alternatively, the radio receiver 14 can operate with only one or a subset of these memories. The Instant Replay operation is also available to the user when the radio receiver 14 or other user device is in MY RADIO mode.

Users have the options of entering preset or favorite channel information via the user interface 22 on the radio receiver 14 (or via a personal computer 46 to which the radio receiver 14 can be connected) or other device for receiving broadcast or streamed content in accordance with embodiments of the present invention. It is to be understood that the Tune Start™ operation need not be limited to preset channels corresponding to manual buttons or dedicated tuning or channel selection buttons on a radio receiver or other user device but rather can also be selected buttons generated on a graphical user interface of the radio receiver. Further, the buffered Smart Favorite™ channels for the Tune Start™ operation of the present invention need not be limited to preset or favorite channels but can also be any selected group of channels that are relevant to the user in some manner. Channels related to the user or to each other in some manner can be automatically selected by the device or entered with user action or control. Further, in a radio with sufficient capacity for buffering and processing, all channels can be processed as buffered Smart Favorite™ channel.

Illustrative Product User Interface

Figure 5:
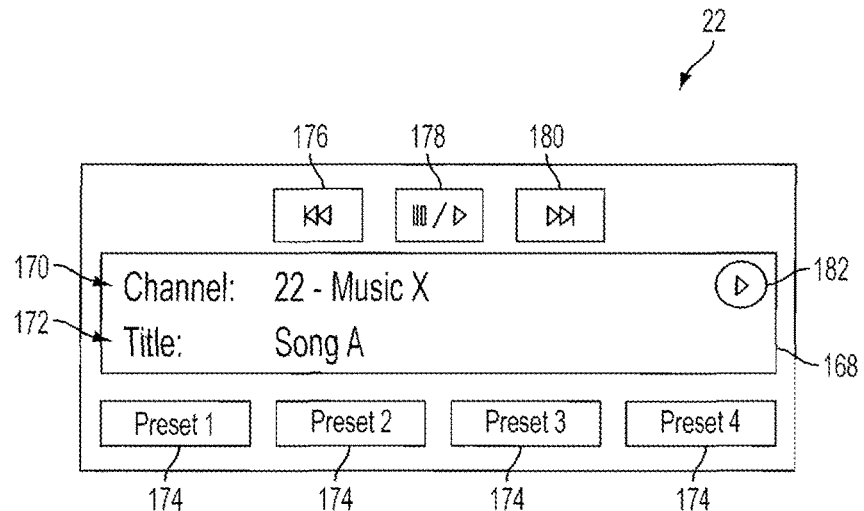
FIGS. 5, 10, 11 and 12 depict user interfaces for navigating broadcast or streamed content in accordance with an illustrative embodiment of the present invention.

FIG. 5 is an example of a user interface 22 for a radio receiver or other user device 14 that allows the user to select a channel for listening. In this specific example, the user can view the channel number and name of the current channel as indicated at 170 in a display area 168, as well as the title of track currently playing as indicated at 172. The user may also select one of four Preset buttons 174 (e.g., Preset 1, Preset 2, Preset 3, and Preset 4) to tune to a different channel, which had previously been assigned to the Preset button by the user. Alternatively, the buttons 174 correspond to other channels related to the user such as user favorites (e.g., most frequently selected by user based on receiver data, or grouped accordingly to favorite genre, and so on). The interface 22 can also provide a Reverse button 176, a Pause/Play button 178, a Forward button 180, as well as optional Pause/Play icon 182 on the display area 168.

This specific example of a radio user interface 22 is intended for illustrative purposes only. It is to be understood that the radio receiver 14 can show more or less information about the current channel and playing track; that there can be more or fewer Preset buttons; that instead of using Preset buttons to select an alternate channel, the radio receiver 14 can support a mode of listing Favorite channels previously selected by the user from which a new channel can be selected; and that the specific complement and arrangement of buttons and display elements can vary greatly from radio receiver to radio receiver. For example, the buttons can be graphical user interface buttons that represent favorite channels (e.g., that are programmed automatically and dynamically to reflect the user's taste over time based on radio receiver operations to select channels/tracks for listening), that are changeable over time, and that are surfed via any one or combination of toggle buttons, dials, up/down buttons provided on the radio receiver 14.

Exemplary Problem Overcome by Tune Start™ Operation

Figure 6:
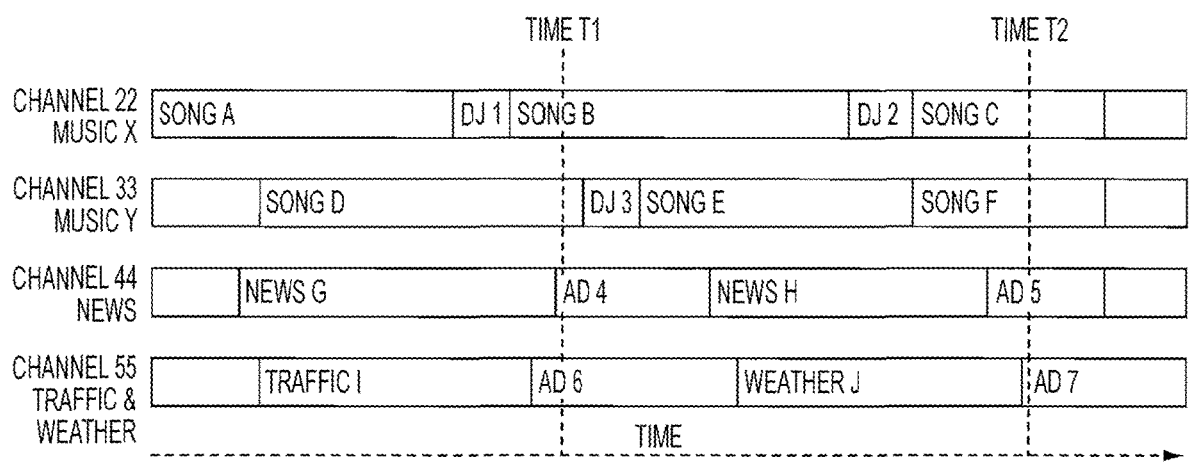
FIGS. 6, 7, 8 and 9 depict examples of broadcast or streamed content as it is received or buffered in accordance with an illustrative embodiment of the present invention.

For illustrative purposes, FIG. 6 illustrates a portion of the content broadcast over a few channels (e.g., channels 22, 33, 44 and 55) to a radio receiver capable of receiving multiple channels. Each track is represented by a rectangle of varying time duration, with the nature of the track content annotated within the box: Song x representing a song, DJ n representing disc jockey banter or station identification between songs, News x representing an uninterrupted segment of news reporting, Ad n representing a commercial advertisement, and Traffic x and Weather x representing uninterrupted reports of traffic and weather conditions, respectively.

If the user is listening to News G on Channel 44, as the news report ends and Ad 4 begins he may want to tune to one of the other channels at Time T1. In doing so:
  Tuning to Channel 22, he would hear Song B, but miss the first portion of that song.
  Tuning to Channel 33, he would hear some of the end of Song D, and then some DJ banter.
  Tuning to Channel 55, he would hear the middle of a commercial advertisement.

Similarly, if the user is listening to Weather J on Channel 55, as the weather report ends and Ad 7 begins she may want to tune to one of the other channels at Time T2. In doing so:
  Tuning to Channel 22, she would hear Song C, but miss the first half of that song.
  Tuning to Channel 33, she would hear Song F, but miss the first portion of that song.
  Tuning to Channel 44, she would hear an ongoing commercial advertisement.

From FIG. 6, it is evident that, in most cases, tuning from a current channel at the end of a track, the user will miss the start of the current rack on another, newly selected channel. This specific example of broadcast content is intended for illustrative purposes only. It is understood that there could be many more channels (e.g., hundreds of channels); that the channels can be broadcast, multicast, or unicast to the receiver; that the channels can be transmitted over satellite, a terrestrial wireless system (FM, HD Radio, etc.), over a cable TV carrier, streamed over an internet, cellular or dedicated IP connection (e.g., 2-way IP) or otherwise transmitted wirelessly or via wireline communications; and that the content of the channels could include any assortment of music, news, talk radio, traffic/weather reports, comedy shows, live sports events, commercial announcements and advertisements, etc. "Broadcast channel" herein is understood to refer to any of the methods described above or similar methods used to convey content for a channel to a receiving product.

It is presumed that the radio receiver 14 has a method of identifying separate tracks through encoding incorporated within the received content, through content metadata conveyed in parallel with the content, or through metadata received via conveyance to the radio receiver separate from the content. This track identification capability is known for many broadcast and streaming services, and is discussed in more detail below.

Tune Start™: Method of Operation

An illustrative method for implementing the Tune Start™ operation involves buffering the content received from multiple channels pre-selected by or for the user, so that tracks from each buffered channel have been queued in radio receiver memory for time-shifted playback from when a track starts if and when the user tunes to the buffered channel during that track and while in LIVE mode. The radio receiver 14 maintains a buffer (e.g., Content Buffer 112 described above), implemented with RAM, HDD, flash or other storage media, in which content from the buffered channels is continuously cached using a modified FIFO (first in first out) method, for example, during reception. The Content Buffer 112 is sized sufficiently such that at least one full track (subject to some maximum track duration) from each buffered channel is maintained in the Content Buffer. The number of buffered channels can be any number depending on the memory and processing constraints of the user device and the amount of memory allocated per channel. As stated above, the radio receiver 14 is capable of playing content either live (i.e., as the content is received), or from content previously cached in the Content Buffer (e.g., in time-shifted playback) during live reception (i.e., Tune Start™ and not MYRADIO mode).

When the user selects a different channel during the LIVE mode, playback begins from the start of a track previously cached in the Content Buffer 112 for that channel (i.e., unless that channel was designated for buffering but live playback). Thus, the user hears content from the new channel from the start of a track. If the user continues to listen to that channel, he effectively is listening to that channel time-shifted, that is, delayed from the real-time content reception by a duration equal to the time the channel was selected minus the time the cached track started broadcasting or transmitting.

As an example, at Time T1 in FIG. 6, the tracks broadcast preceding Time T1 will have been cached in the Content Buffer 112. Those tracks that had been broadcast in entirety will be cached in the Content Buffer in entirety. Those tracks still being broadcast at Time T1 will be partially cached with buffering of those tracks continuing.

Figure 7:
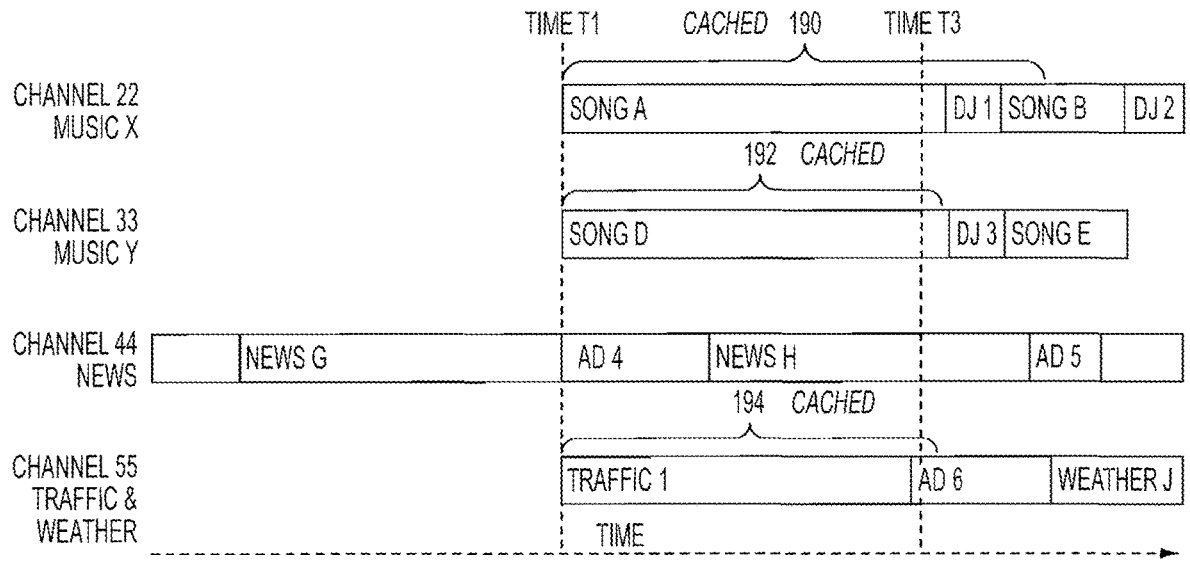

If the user is listening to Channel 44 at Time T1, and chooses to select one of the other channels, the content available for play by the radio receiver 14 from the Content Buffer 112 is illustrated conceptually by FIG. 7. Thus, selecting Channel 22 begins play from the start of Song A from the Content Buffer 112, or selecting Channel 33 begins play from the start of Song D from the Content Buffer, or selecting Channel 55 begins play from the start of Traffic J from the Content Buffer.

If the user selects Channel 22 at Time T1 and continues to listen to that channel, the radio receiver 14 continues to cache the live content of Channel 22 (as it does for all of the buffered channels). Therefore, the user is effectively listening to cached content from the Content Buffer for Channel 22, time-shifted (delayed) from the live broadcast by the duration indicated by the Cached bracket 190 shown in FIG. 7. Selecting either Channel 33 or Channel 55 at Time T1 results in similar operation, with the radio receiver 14 playing cached content from the start of Song D or Traffic 1, respectively, and continued play from that channel proceeding with some time delay of durations as indicated by Cached brackets 192 and 194, respectively.

Figure 8:
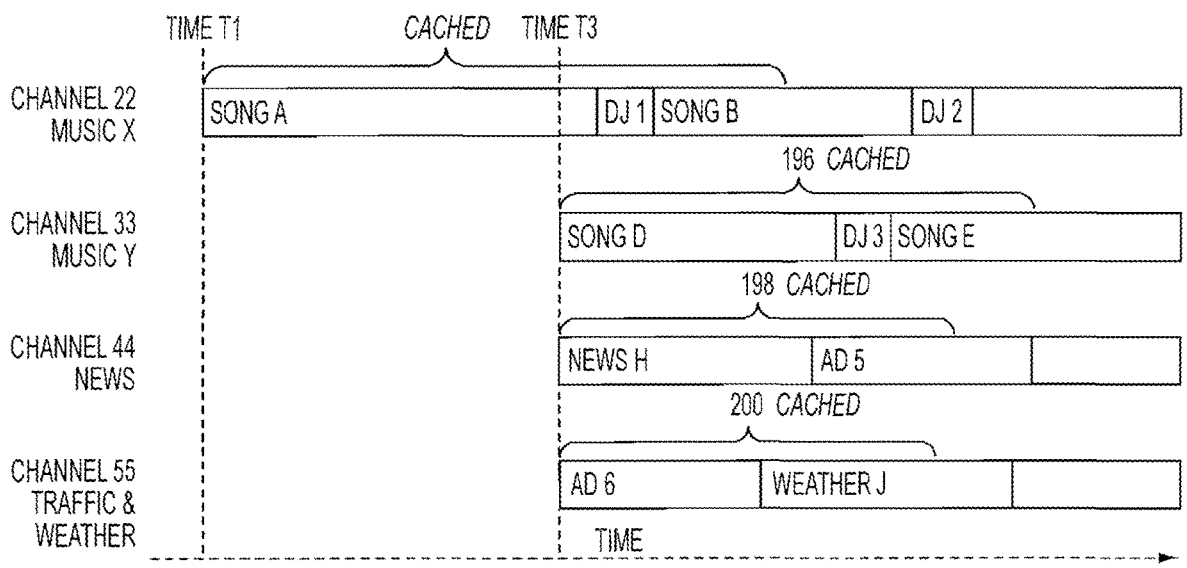

As a further example, if the user selects Channel 22 at Time T1, then decides he would rather listen to different content at Time T3, the content available for play by the radio receiver 14 from the Content Buffer 112 at Time T3 is conceptually illustrated by FIG. 8. Thus, selecting Channel 33 begins play from the start of Song D from the Content Buffer, or selecting Channel 44 begins play from the start of News H from the Content Buffer, or selecting Channel 55 begins play from the start of Ad 6 from the Content Buffer.

In accordance with illustrated embodiments of the Time Start™ operation, changing from channel to channel over time produces the same result, that is, selecting a new channel will result in playback at the start of a track on the new selected channel. Thus, the user enjoys hearing tracks from their starts or beginnings when changing channels, solving the previously stated problem.

The illustrative examples above can be implemented via an algorithm wherein the start of the oldest cached track (i.e., the track that has been cached for the longest period of time and its start point is still in the cache) for a channel is selected for play when tuning to that channel. Alternatively, an algorithm can be used wherein the start of the track most recently broadcast for a channel is selected for play when tuning to that channel. For example, referring to FIG. 6, when first listening to Channel 44 and selecting Channel 22, play may start from the beginning of Song B, since Song B is the most recent broadcast track for Channel 22. Likewise referring to FIG. 7, when first listening to Channel 22 and selecting Channel 33, play may start from the beginning of Song E, since Song 13 is the most recent broadcast track for Channel 33. It is understood that different algorithms may be used to choose which cached track is played from its start up on channel selection, including but not limited to playing the oldest cached track; playing the newest cached track; playing the oldest cached track that had not previously been partially heard by the user; playing the oldest cached track that had not previously been fully heard by the user; playing the oldest cached track that is within some time limit t from the live broadcast; and various combinations of the above.

Managing Buffer Contents

Different methods for managing the buffered channel contents can be used, depending on the storage resources of the radio receiver and the different combinations of features achieved by illustrative embodiments of the present invention. For example, in one implementation, the radio receiver 14 maintains at least one full track in the Content Buffer 112 for each buffered channel. Each time a new track is cached for a given channel, the previous older track for that channel is deleted from the buffer to make room for additional caching. This is the method exemplified by the examples shown in FIGS. 7 and 8.

In accordance with an alternative illustrative embodiment, the radio receiver 14 maintains more than one full track in the Content Buffer 112 for each buffered channel. The number of tracks cached for each channel may be fixed in number (i.e., n tracks per channel) or based on time duration (i.e., all full tracks cached within the previous m minutes). In still yet another illustrative embodiment, the radio receiver 14 maintains all content, whether complete or incomplete tracks, for a set duration per track (i.e., all content received for the channel for the previous m minutes) or a set amount of storage per track (i.e. all content received for the channel that can be stored in k bytes of Content Buffer memory.)

Content Buffer 112 storage may be allocated to buffered channels based on a fixed amount per channel (e.g., by duration or by storage), or may be dynamically allocated to buffered channels to accommodate differing track lengths currently cached (i.e., each channel allocated storage so that it can cache n channels for that channel).

The radio receiver 14 can limit the length of a cached track to a set maximum duration or size (e.g., 10 minutes or 4 MBytes) to accommodate unusually long tracks. Depending on intended behavior, such long tracks may be continuously cached in a FIFO manner so as much of the track as possible is maintained in the cache, or may be deleted (so the user is unable to play from a cached track unless it is certain it can be played from the start).

Multiple methods for storing and retrieving cached data into and out of the Content Buffer 112 can be used, including but not limited to continuous ring buffers, fixed block allocations and linked lists, and other methods apparent to those skilled in the art.

Navigating Cached Channel Contents

When selecting a channel that begins play from the start of a cached track, multiple methods can be used to provide the user with control over content play in accordance with illustrative embodiments of the present invention.

In accordance with one illustrative method (i.e., which may be the simplest method from a product user interface perspective), no control is afforded to the user for navigating (e.g., scanning forward or back) through cached content when playing back a channel. When the user selects a channel, content is played from that channel continuously while it is selected. If the channel started playing from the start of a cached track, it will continue to play from the cached Content Buffer continuously for as long as it remains selected. No method is provided for the user to jump to live play of the content currently received for that channel.

In an alternate illustrative embodiment, the radio receiver 14 includes a control (e.g., the exemplary Forward Button 180 illustrated in FIG. 5) that allows the user to force content play from the live content currently received for the channel.

In an alternate illustrative implementation, the radio receiver 14 includes controls (e.g., the exemplary Reverse and Forward Buttons 176 and 180 illustrated in FIG. 5) that allow the user to skip between tracks cached for the current channel in a reverse and forward direction, respectively. This is most useful for radio receivers that can cache more than one full track per channel.

In accordance with an illustrative embodiment of the present invention, one policy that can be implemented by the radio receiver 14 on a channel change can be to play from the start of the most recent track partially cached in the Content Buffer from that channel. The user can then use the Reverse button 176 to skip to the start of the previously cached track, and press the button again to go to the track cached before that one, and so forth until the oldest track cached in the buffer. Similarly, the Forward button 180 can be used to skip forward through cached tracks, with a final press starting live (real-time) play of that channel content. It is to be understood that a policy implemented by the radio receiver 14 as described herein can be a set of rules or algorithm(s) implemented in software, or indicated in metadata provided to the radio receiver, for example, for controlling radio receiver functions such as caching or buffering, selecting which track from which to play following channel change, or channel re-selection, the play position (e.g., from the start or other position in the track) from which to playback the cached track, and so on.

Alternatively, the policy implemented by the radio receiver 14 on a channel change can be to play from the oldest fully or partially cached track in the Content Buffer 112 from that channel.

Use of the Forward and Reverse controls (e.g., buttons 180 and 176, respectively) can alternatively skip forward and backward within cached content to locations other than track boundaries, e.g., by some fixed time duration, some fixed storage amount, or by presence of metadata fields embedded in the cached content or maintained in separate data structures referenced to the cached content.

The radio receiver 14 or other user device may also maintain an internal marker indicating the last play position within the buffer when a user tunes away from a channel. Such marker can be subsequently used as a navigation marker that is similar to the above-mentioned track boundaries if the user later tunes back to that channel, allowing the user to conveniently return to a previous listening point (i.e., even if within a track, and not necessarily corresponding to a track boundary) with the Forward and/or Reverse controls, or a control dedicated to returning to previous play position.

The radio receiver 14 can also provide a control to pause play (e.g., the Pause/Play button 178 illustrated in FIG. 5). On pressing this button during play (e.g., from live or cached content), the radio receiver 14 halts audio output but continues to cache new live content for the channel into the Content Buller. When pressed again, play continues from the paused point in the cached content.

Multiple policy alternatives can be used to handle the re-selection of a buffered channel, i.e., what to play when reselecting a channel for which the track played when that channel was last selected is still in the Content Buffer. In one approach, re-selection results in playback at the point where the channel was last tuned away, or at the oldest content in the Content Buffer for that channel if the previous stop point has since been flushed from the Content Buffer. In an alternative approach, re-selection starts play at the next cached track start, or from live play.

Buffered Channel Selection

A number of different methods can be used to manage which channels are selected for buffering in the Content Buffer 112 (i.e., hereinafter "buffered channels"), depending on radio receiver content reception capabilities (e.g., the number of channels that can be received simultaneously) and storage/computation resources.

In accordance with one illustrative embodiment of the present invention, all receivable channels can be buffered by the radio receiver 14 and therefore all of the channels are buffered channels.

For radio receivers 14 that can receive a limited subset of broadcast channels simultaneously, different methods can be used to select the buffered channels.

In accordance with an illustrative embodiment of the present invention, the number of channels that can be buffered is equal to or greater than the number of channels allowed for selection by the user as a Preset or Favorite channel. Thus, all Preset or Favorite channels are buffered so that when any of these channels are selected, play can begin at the start of a track on one of these channels.

In accordance with another illustrative embodiment, the user selects a subset of Preset or Favorite channels, up to the limit of buffered channels supported by the radio receiver, to be designated as buffered channels.

In accordance with another illustrative embodiment, the user selects specific channels, up to the limit of buffered channels supported by the radio receiver, to be designated as buffered channels independent of their selection as Preset of Favorite channels.

In accordance with an illustrative embodiment of the present invention, the content delivery system is configured to allow radio receivers 14 to receive certain groups of channels simultaneously, e.g., by combining a group of channels into a single physical Payload Channel which can be received by the radio receiver. All the channels in such a group are then either automatically designated buffered channels or are candidates for the user to select as buffered channels. If the radio receiver is capable of receiving multiple Payload Channels at the same time, all the channels in all of the simultaneously received Payload Channels can be designated buffered channels. The content service operator communicates to the end user which groups of channels can be selected as buffered channels, with groups of channels optionally organized by some measure of content affinity (e.g., news channels, sports channels, music channels, etc.).

In accordance with an illustrative embodiment, the radio receiver or user device 14 speculatively selects all channels in one or more Payload Channels as long as at least one channel in the Payload Channel has been selected as a buffered channel by the user.

In accordance with another illustrative embodiment, the radio receiver or user device 14 selects the buffered channels without explicit user selection and instead based on channel or content interest derived by the radio receiver software. For example, the radio receiver 14 can select buffered channels based on historical selection time by the user, e.g., buffering the channels most often selected for play by the user. The radio receiver 14 can select buffered channels based on historical topic interest by the user, e.g., buffering the channels playing content attributed with topic metadata that matches the topic metadata most often historically selected for listening by the user. The selection of channels for buffering can be dynamic over time to reflect the type of content a user historically listens to throughout the day. For example, more news channels can be buffered in the morning when the user typically listens to mostly news content, and more jazz music can be buffered in the evening.

It is understood that multiple methods for selecting buffered channels can be combined. For example, automatically selecting channels in the users Presets or Favorites list while adding additional channels based on explicit user selection or historical listening frequency; or in a product with limited buffering capacity, selecting as buffered channels the subset of Preset or Favorite channels that are most frequently selected by the user.

Selection of Buffered Channel Content to Playback

In accordance with illustrative embodiments of the present invention, a single radio receiver or user device 14 supports multiple policies for selecting buffering versus live playback on channel selection, as well as for which buffered content is selected for playback and from which playback point in a buffered content segment or sample to commence playback. For example, the selected playback point of a buffered Smart Favorite™ channel is chosen based upon at least one of (i) type of content, (ii) type of channel, (iii) natural transition of the content (as may be known or determined by programming personnel), (iv) a look-up table, (v) user designation, (vi) time of receipt, and (vi) data associated with the channel received by the receiver, among other criteria. Illustrative Channel Play On Select assignments are further described below wherein, following a channel change, buffered content can start play from newest track or segment, or from the oldest track, in the buffer for that channel, or from real-time or live content. Further, the selected playback point can be from the beginning of the track or cached segment, or after a selected number of samples or time interval into the track or segment (e.g., the number of samples will vary, in general, with each channel, with each song or clip, and even, for example, with the content that was playing on the previously tuned channel), or at a natural transition point in the content such as a track or song intro (e.g., an initial or introductory segment within a music track, or after, or at a certain point during, a talking segment at the beginning of a music track).

In accordance with illustrative embodiments of the present invention, broadcast metadata for each channel explicitly indicates the policy to be used by the radio receiver or device 14 for each channel. In another implementation alternative, broadcast metadata characterizing the content type for each channel implicitly indicates the policy to be used by the radio receiver or user device for each channel. In another implementation alternative, broadcast metadata for each track indicates the policy to be used when that track is cached in a buffer (e.g., Content Buffer 112). In another illustrative implementation, a default policy is based on channel policy, but is overridden if that channel receives and caches a track for which specific content type or policy is specified.

Identifying Track Boundaries

The radio receiver or user device 14 implements a method for identifying track boundaries in the received content in accordance with illustrative embodiments of the present invention. In one illustrative embodiment, track identification implemented by some commercial satellite radio receivers is employed wherein metadata is transmitted in parallel with broadcast digitized audio content. The metadata can include, among other fields, a Program Identifier (PID) that indicates, when the device 14 has received a new PID value, that a new track has started, as illustrated in FIG. 9.

Figure 9:
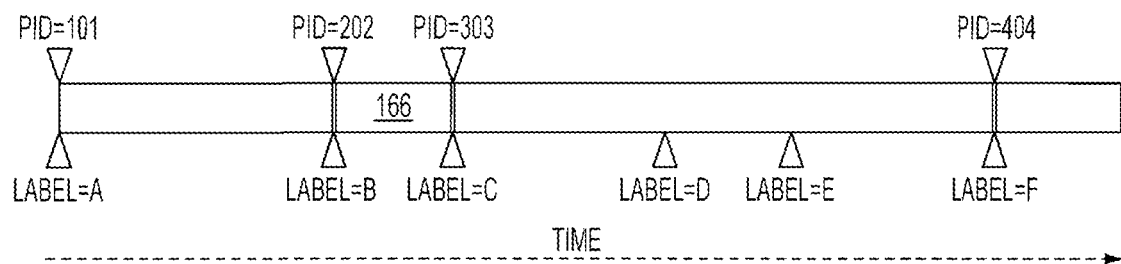

With reference to FIG. 9, which is an exemplary case of a channel playing songs with DJ announcements between the songs, the PID changes value at the start of each song and at the start of each segment of DJ announcements 166, allowing the radio receiver 14 or other device to determine the start of each track for purposes of caching and playback. Other metadata such as program Labels (e.g., artist name, song title, etc.) can change; however, for the purposes of effective track identification, these changes can be ignored by the radio receiver 14. For example, as shown in FIG. 9, Label=D and Label=E are changed by the DJ during song "C" without a corresponding LID change.

Other methods can be used for identifying track boundaries as appropriate for the type of content and content delivery mechanisms. The particular method used for track identification is not critical, as long as some type of method is provided.

In accordance with other illustrative embodiments of the present invention, for skip operations in a satellite and/or terrestrial mode, the radio receiver or device 14 can identify track boundaries or skip markers as either: PID changes in the broadcast metadata, or changes in Artist/Title labels in the broadcast metadata. For example, a radio receiver or device 14 can automatically select one of the methods above for each channel, based on the channel content type of the channel as follows: for music, track boundaries or track skip markers are based on PID changes in the broadcast metadata; and for content other than music, track skip markers can be based on Artist/Title label changes in the broadcast metadata. Thus, a good user experience is achieved for most channels when using the Tune Start™ operation, given that (a) PIDs are most closely managed by operations for music channels and are intended to identify "song" starts, (b) PIDs may be infrequent in non-music channels such as talk, sports, and news and therefore may not provide sufficient granularity for user IR navigation for these channels, and (c) label changes do provide reasonable granularity for user IR navigation for the non-music channels.

If the device 14 is operating in an IP mode (e.g., receiving content via streaming), track skip markers can be based on the Artist/Title label changes in the metadata transmitted in-band with the audio stream or in a separate band from the audio stream. Alternatively, the device can emulate track marker behavior of a radio receiver by using, for example, data and a parameter that identifies channel content type to behave similarly to use of PID and channel content type, respectively, as described above.

Additional Media Types

It is to be understood that the described above are also applicable to products that receive content other than audio. For example, products receiving multiple video channels, image streams, or combinations of audio and video can employ the same methods for buffering a content channel such that a user navigating between channels is able to enjoy content segments played from the start when arriving at a new channel.

Masking Buffered Channel Playback

A number of different implementations can be used in the user interface (UI) 22 regarding the user's awareness of which channels are buffered channels (i.e., played with a slight delay from real-time) and which channels are not buffered channels (i.e., played as received in real-time).

For channels playing non-time-sensitive content (e.g., music, a comedy show, a pre-recorded talk show, etc.), the UI 22 can "hide" the fact that, when a user tunes to a buffered channel, the radio receiver or other user device 14 begins play from the start of a cached track. In these cases, it generally does not matter to the user that the cached track is being delayed from real-time reception for a few minutes or less. The user simply enjoys always starting at the beginning of a track when changing to a buffered channel. This illustrative implementation creates opportunities to simplify the user interface, e.g., eliminating the need for functions such as skipping forward to a new track or live play, or reverse to previous tracks, in cases where these functions would be difficult to support in a device 14 with simplified user interface controls.

In contrast, for channels playing time-sensitive content such as live sports events or news, weather and/or traffic updates, it may be important to reveal to the user that the content playing from a buffered channel has been delayed from real-time, so they may choose to skip to real-time received content if desired.

In accordance with another illustrative embodiment, only channels with non-time-sensitive content are buffered channels, and no user interface 22 features are provided with which to skip ahead (or back) for such channels. In yet another illustrative embodiment, the user can explicitly choose to allow buffering of additional time-sensitive channels (i.e., the user judges the delayed playback to be inconsequential) through selection of specific channels or an overall device preference setting.

In accordance with another illustrative embodiment, the radio receiver 14 can impose a maximum delay from real-time allowed for all buffered channels, specific buffered channels, or just the time-sensitive buffered channels. For example, the maximum delay for a traffic/weather channel might be limited to 5 minutes, such that tuning to that channel will play from the start of a cached track only if the track start is within 5 minutes of live play; otherwise it will play live content.

Illustrative Use Case and Tune Start™ Operation

As stated above, the Tune Start™ operation improves the experience resulting from a common user behavior, that is, the listener occasionally skips (e.g., "surfs") between a small number of favorite channels, which may be a mixture of music and non-music channels, to find something to listen to. Changing to a new channel often results in the user missing the start of whatever song or news/talk or other segment is playing on that newly selected channel at the time.

For example, the Tune Start™ operation improves the experience of a user having this common user behavior as follows: the user is listening to news on channel 123 and her interest in the currently playing content is waning (e.g., segment is transitioning to an advertisement or interstitial content, or the topic is of low interest, or she simply wants to hear something different). She selects one of her preset channels, music channel 234, for example. She hears the start of a song on channel 234 (even though live broadcast for channel 234 might be in the middle of song). If she does not want to hear that song, she selects yet another preset channel (e.g., music channel 345) and hears a song from that channel also from the start. The result is that she hears the "current segment" (e.g., a song in this example) for each of these selected preset channels from its start, instead of from somewhere in the middle of that currently selected content segment.

Furthermore, after listening to a song on channel 345, she might re-select news channel 123. By this time, it is likely that her radio receiver or other device 14 has now queued up the start of a fresh news segment for her to enjoy from the beginning.

User Interface (UI) Challenges and Solutions

The following are some of the UI and performance challenges that may occur, and the solutions achieved by illustrative embodiments of the present invention when implementing the Tune Start™ function.

Determining which Segment to Queue for Next Play

Once the user has been listening for 10 minutes or so, it is likely multiple segments would have been queued for each of the Tune Start™ operation channels. When tuning to a Tune Start™ operation channel playing music, selecting the oldest cached segment (i.e., a song), has advantages. Starting with the oldest segment means that if the user tunes away from this segment (not interested) and then revisits this preset shortly thereafter, there will be a fresh segment queued and ready to start (the next oldest segment). This approach can be used for music since it generally does not matter to the user whether the song was broadcast 10 minutes ago vs. started broadcasting 30 seconds ago. In contrast, when tuning to a Tune Start™ channel (e.g., a Smart Favorite™ channel) playing news, the user will often prefer to hear the start of the currently broadcasting segment (i.e., the newest segment), so it is as close to real-time as possible. This means Tune Start™ should by default play the newest segment cached for that channel. Furthermore, for Sports, the user may prefer to hear live play-by-play when tuning to the channel. Thus, selection of buffered content for playback can be controlled on the basis of the content and/or channel type in accordance with illustrative embodiments of the present invention.

Handling a Return to a Smart Favorite™ Channel

For example, a user is listening to the middle of a song on channel 234, and then he changes to channel 345 (i.e., hearing a segment start its beginning on channel 345). Unsatisfied, the user returns back to channel 234. Of particular interest is what the radio receiver or device 14 plays when Channel 234 is re-selected, assuming Channel 234 is enabled as a Smart Favorite™ channel. Does the radio receiver or device 14 continue playing channel 234 at the point the track was playing when the channel change occurred, or does the device 14 play from the start of the next cached segment (i.e., song) for channel 234? If no "next segment" has yet to be broadcast on channel 234, does the radio receiver or device 14 play channel 234 where it left off in the cached content or jump to live content? It can be assumed that the user is tuning away from 234 because he did not want to hear the rest of that song on channel 234 at all, or because he merely wanted to briefly see what was playing on channel 345. Both are legitimate user intentions. It is therefore assumed that the user would not want the user device 14 to play from the start of the song that was last playing on channel 234, as this action of the user device 14 would likely contradict all implied user intentions and could be frustrating to the user.

More specifically, Last Play Point shall hereinafter refer to the buffer position corresponding to audio content that was playing at the instant the user tuned away from a channel (and therefore the last content the user heard from that channel). Last play Point can be anywhere within a track. It is assumed that "channel-reselection" is merely a sub-condition of channel selection in general, referring to a situation where a channel is selected and the Last Play Point is still within the FIFO BIR buffer. User intent when re-selecting a Smart Favorite™ channel can be any of the following:

To Resume Track Play: User wishes to resume playing from the exact Last Play Point of the re-selected channel. This is similar to "un-pausing and resuming" buffered playback for that specific channel.

To Resume Channel Play: User wishes to resume playing from the re-selected channel, but there is no need to resume play from exactly the Last Play Point of the re-selected channel. This is similar to tuning to the live channel; the user has simply decided he wants to listen to whatever is playing on the channel.

To Check for New Track: User wishes to hear what is now playing on the re-selected channel, with hope of finding a new track to listen to, preferably from the track start. This supports a core use case for Smart Favorite™ channels, "preset surfing."

When the user re-selects a channel, the user's intent in doing so is ambiguous to the radio receiver or device 14. The challenge, therefore, is to provide a radio response and supportive UI elements to satisfy as many of these intents as reasonably possible with minimal user interaction and consistent radio behavior. Behavioral support for Smart Favorite™ channel re-selection is necessarily a compromise, with such objectives as: (1) minimize need for further user actions after channel re-selection for as many use cases as practical; (2) provide transparent and intuitive radio responses (e.g., a user is preferably unaware the radio receiver or device 14 is doing anything beyond just "re-tuning to the channel" in most cases); and (3) provide consistent responses (e.g., to avoid surprising and confusing the user).

For channels for which Tune Start™ behavior is enabled (e.g., not tune to Live mode), Table 1 describes exemplary radio responses to channel re-selection and further user actions, if any, under conditions of various user intentions and whether the radio receiver or device 14 has buffered the start of a new track since the re-selected channel was previously tuned away. In general (e.g., with some exceptions discussed below), the rule for the radio response on channel re-selection is as follows:

IF the start of a newer track has been buffered since the Last Play
    Point
THEN
    Play the start of the newer track
ELSE
    Play from Live
ENDIF For 4 of the 6 conditions shown in Table 1, the simple rule above satisfies the user's intent. The two exceptions occur when the user wants to resume play at the channel's Last Play Point. In these cases, the user will hear live content, and will need to use IR navigation controls (to extent allowed) to move backwards until the Last Play Point is heard.

For channels with unrestricted IR (e.g., talk, news, sports, and so on), the user can skip back and/or use rewind as necessary. For channels with restricted IR (e.g., music), the Last Play Point may be unreachable in the exception cases, since the user is limited in rewind capabilities. However, in most use cases, it is for non-music that the user will most interested in resuming an old Last Play Point, so this compromise is acceptable.

TABLE 1

Re-Selection Behaviors

| Condition | | Re-Selection Response | |
|---|---|---|---|
| User Intent | Newer Track Buffered? | Radio Response | User Action |
| Why did the user re-select the channel? | Is the start of a newer track in buffer after previous play point? | What does the radio play immediately in response to the channel re-selection? | What does the user need to do, if anything, to fully achieve their intent after the channel is re-selected? |

TABLE 1-continued

Re-Selection Behaviors

| User Intent | Condition: Newer Track Buffered? | Re-Selection Response: Radio Response | Re-Selection Response: User Action |
|---|---|---|---|
| To Resume Track Play . . . Continue playing track exactly where last heard when previously leaving channel. | Yes (Newer Track Buffered) | Plays from start of newer track | For non-music, press Skip Back and Rewind to find Last Play Point. |
| | No (No Newer Track Buffered) | Plays Live content from channel. | Press Rewind to audibly search for Last Play Point. |
| To Resume Channel Play . . . Return to the channel, but not important to play from exact play point last heard when previously leaving channel. | Yes (Newer Track Buffered) | Plays from start of newer track | None Required. |
| | No (No Newer Track Buffered) | Plays Live content from channel. | None Required. |
| To Check for New Track . . . See if a new "better" track is now available for the channel. | Yes (Newer Track Buffered) | Plays from start of newer track | None Required. (User hears start of new track) |
| | No (No Newer Track Buffered) | Plays Live content from channel. | None Required. (User hears old track still playing) |

In accordance with other illustrative embodiments of the present invention, when reselecting a channel the radio may resume playback from the Last Play Point. For channels for which Tune Start behavior is enabled (e.g., not tune to Live mode), Table 2 describes exemplary radio responses to channel re-selection and further user actions, if any, under conditions of various user intentions and whether the radio receiver or device 14 has buffered the start of a new track since the re-selected channel was previously tuned away.

TABLE 2

Re-Selection Behaviors

| User Intent | Condition: Start of Newer Track Buffered? | Re-Selection Response: Radio Response | Re-Selection Response: User Action |
|---|---|---|---|
| Why did the user re-select the channel? | Is the start of a newer track stored in the buffer after the previous play point of the channel? | What does the radio play immediately in response to the channel re-selection? | What does the user need to do, if anything, to fully achieve their intent after the channel is re-selected? |
| To Resume Track Play . . . Continue playing track exactly where last heard when previously leaving channel. | Yes (Start of Newer Track Buffered) | Plays from start of newer track | For non-music, press Skip Back and Rewind to find Last Play Point. |
| | No (No Start of Newer Track Buffered) | Plays content from the Last Play Point | None Required. |
| To Resume Channel Play . . . Return to the channel, but not important to play from exact play point last heard when previously leaving channel. | Yes (Start of Newer Track Buffered) | Plays from start of newer track | None Required. |
| | No (No Start of Newer Track Buffered) | Plays content from the Last Play Point | None Required. |
| To Check for New Track . . . See if a new "better" track is now available for the channel. | Yes (Start of Newer Track Buffered) | Plays from start of newer track | None Required. (User hears start of new track) |
| | No (No Start of Newer Track Buffered) | Plays content from the Last Play Point | None Required. (User hears old track still playing) |

In accordance with other illustrative embodiments of the present invention, the radio user interface can offer alternate channel tuning methods for clarifying the user's intent when reselecting a channel as either (a) preference to resume playback from the Last Play Point, or (b) no preference to play from the Last Play Point. In such an embodiment, selecting the user interface tuning method (a) results in play from the Last Play Point as long as it is still present in the channel's buffered content, and selecting the user interface tuning method (b) results in the same behavior described in Table 1. Though this method adds some additional complexity to the user interface, it allows the user to explicitly resolve the above-mentioned ambiguity of the user's intent for channel re-selection The handling of some special channel selection cases and how they are handled will now be described in accordance with illustrative embodiments of the present invention. In the situation where there is no track start in the BIR Buffer, the channel is played from Live when selected. This situation may occur within the short period after power-up or after changing which channels are designated as Smart Favorite™ channel, but will otherwise be unusual after 10 or 15 minutes of BIR buffering with the same set of Smart Favorite™ channels so designated.

In some instances, radio receivers or devices 14 can be restricted in terms of IR navigation capabilities. For example, content channels in a transmitted stream can be designated a particular navigation class selected from unrestricted, restricted, and disallowed. For an unrestricted channel, channel content in the IR buffer can be navigated without restriction. For channels designated to have restricted IR navigation, the channel content in the IR buffer can be navigated but with restrictions as to the number of skips (e.g., a radio receiver or device 14 can be restricted to only a selected number of skips in a given time period). For content channels designated to have disallowed navigation, a radio receiver or device 14 is prevented from navigating the content in the IR buffer.

Thus, for channels designated to have restricted IR navigation, a limit to the number of back skips per hour may make the Last Play Point inaccessible to the user, even though it is technically still in the buffer. Since this situation also implies there is a newer track start buffered between the current play point and the older Last Play Point (meaning it has been tuned away long enough to start accumulating new content), this is an acceptable compromise to usability.

Identifying "Segments" Consistently

From the user's perspective, skipping over short segments such as DJ/announcement interstitials, advertisements, etc. and queuing only "real" segments (songs, news segments, sports segments, etc.) from the start when changing to a Tune Start™ operation channel would be preferred. However, a content provider may prefer not to facilitate skips over advertisements and some announcements. Further, segments may not be consistently identified for all channels. For example, most (but not all) music channels curated by the broadcaster may mark songs by PID (Program ID) changes, and a "song" is usually distinguishable from an interstitial. However, only PAD value changes may distinguish segments for many news/talk/sports channels. For some news/talk channels, PAD values changes much more frequently than a logical "segment", e.g., cycling stock tickers during a financial news program or cycling score/game statistics during a sports broadcast. As described above, different demarcations between content segments or tracks can be used, depending on content and/or channel type, for skipping purposes in accordance with illustrative embodiments of the present invention.

Avoiding Complex Controls

In accordance with illustrative embodiments of the present invention, no additional controls beyond simply changing channels are required to benefit from the Tune Start™ operation. In accordance with another illustrative embodiment of the present invention, a device 14 can provide more advanced capabilities such as jumping to live content, navigating forward/back through segments cached using the Tune Start™ operation. For example, Tune Start™ operations can use controls already provided for similar operations, such as Instant Replay (e.g., the Reverse, Forward and Pause buttons 174, 176 and 180).

Avoiding Complex Configuration

Tune Start™ operation can be implemented in a user device 14 without user configuration. Alternatively, if some configuration (e.g., selection of preset or user favorite channels) is desirable or necessary, it is preferably simple and intuitive such as instructions and buttons or other user input control means provided via the UI 22.

Interaction with Other User Device Recording/Caching Features

Other user device features can be provided that are related to the Tune Start™ operation, including, for example: Instant Replay to Pause, skip back/forward in a RAM buffer for the current channel. In addition, other user device features can impact the same channel caching resources required by the Tune Start™ operation. For example, background recordings may require recording of 1 or more channels, separate from the Tune Start™ channels, in response to an explicit user request or automatic function implemented by the radio receiver.

The Tune Start™ operation UI and underlying behaviors interact with the above features such that: the UI remains intuitive without a lot of confusing modality; and the prioritization of active features that compete for the same limited receiver channel extraction capacity do not confuse the user with configuration choices or features mysteriously switching from available to unavailable.

Tune Start™ Operation UI 22 and Behavior

The Tune Start™ operation can be presented on the UI 22 as an extension to an Instant Replay (IR) function, for example. In some respects, a Tune Start™ channel can be considered a channel that already has some Instant Replay history cached, and play begins from a start of a cached segment when selected. The Tune Start™ operation is effectively "multi-channel replay" with some additional beneficial behaviors enforced when initially selecting the channel. When selecting a channel that is enabled for Tune Start™ operation, Instant Replay indicators can be used to reflect whether the content is being played real-time versus from cached content. The same indication that content is being played from the IR buffer can be used when playing Tune Start™ operation channel from cached content (e.g., in the content buffer 112). Thus, there is no need to configure the UI 22 with two different indicators for these functions. When listening to a channel that is enabled for the Tune Start™ operation, the normal Instant Replay buttons can be provided to optionally navigate the cached content. A user can skip forward to live content, skip backward for however many segments are still in the cache, pause, skip forward among segments in the cache, and so on, in the same manner as for the Instant Replay function. The minimum content cache buffer for each Tune Start™ channel can be 10 minutes, for example.

The number of channels that can be simultaneously designated as Smart Favorite™ channels (i.e. supported with their own BIR Buffer) can vary, depending on radio receiver or device 14 resources and device data/audio extraction capabilities. For simplicity (i.e., to keep configuration simple and transparent for the user), a device 14 with a capacity of "n" simultaneously designated Smart Favorite™ channels can designate the first"n" channels in the active preset bank as Smart Favorite™ channels. Therefore, when the user selects a new preset bank, the first "n" channels are automatically designated as Smart Favorite™ channels, and begin filling their respective BIR Buffers. A more complex device UI 22 can allow the user to designate some set of "n" specific channels as the Smart Favorite™ channels, regardless of whether they are in an active preset bank. Further, as stated above, devices 14 may support more simultaneous Smart Favorite™ designations and buffering thereof, depending on their simultaneous channel extraction and storage capabilities. For example, a device with a capacity of "n" simultaneously designated Smart Favorite™ channels where "n" is sufficient to accommodate the total number of channels in "m" preset banks of the device can automatically maintain all channels in each attic "m" preset banks as Smart Favorite™ channels.

In addition, for simplicity, selection of related channels supported by the Tune Start™ operation can be represented by a Favorites bank. As stated above, the selection of Favorites channels need not be preset channels but rather user favored or otherwise related content. For example, a Favorites bank can consist of the preset buttons channels, or a group of channels that are statistically selected for a user based on listening habits, or a group of channels having a similar music genre, among other related groups of channels. Some user devices 14 can support multiple user preset banks (e.g., two or more banks with 5 Smart Favorite™ channels each, for illustrative purposes). Whenever a given user preset bank is active, the 5 channels in that bank are by default supported by the Tune Start™ operation. When changing to a different user preset bank, the Tune Start™ operation for the previously selected bank of channels is disabled, and the new bank of 5 preset channels are supported instead. The replacement of the currently designated Smart Favorite™ channels from a previously active Favorites bank with the set of channels from a new active Favorites bank can be delayed until the new active Favorites bank has been the active bank for 5 seconds, for example. By way of an example, the 5 channels in the current Favorites bank are automatically designated as Smart Favorite™ channels. Also, the UI 22 can require the user to cycle through the display of Favorites banks in order to view or select a new bank. As soon as a new Favorites bank is displayed, the BIR 112 buffers for the Smart Favorite™ channels from the previous bank would be immediately flushed as the channels in the new bank are designated as Smart Favorite™ channels. However, if the user is merely viewing other banks and ultimately returns to the originally selected hank, the original buffered content of the originally selected bank would be lost as soon as the user starts perusing the other banks, resulting in a poor user experience. The delay (e.g., 5 seconds) avoids loss of the buffered data for situations where the user is merely viewing the list of other banks, but ultimately stays with the current bank. The delay need not be imposed on designating the channels in the active Favorites bank as Smart Favorite™ channels after power up. If the user selects a new active Favorites bank and a channel is assigned to both the previously active Favorites bank and the new bank, the contents of the BIR buffer for that channel need not be flushed as a result of selecting the new Favorites bank.

When selecting a supported channel track to be played following a channel change, Tune Start™ operation behaviors optimize the user experience depending on the channel content type. In one illustrative embodiment, each channel is designated for cached track selection for playback based on at least one of the Play On Select methods described below.

(i) Newest—start play from the beginning of the newest track in the cache (e.g., content buffer 120): This method is used for content where the user will typically want to hear the most recent content, but it does not need to be strictly real-time. Talk and news channels are types of channels that can be designated for Newest Play On Select.

(ii) Constrained—similar to Newest, except that the start of the newest track in the cache is played only if it is within a fixed window of 5 minutes, for example, from Live; otherwise play starts with live content: This method is used for content where play from track start provides benefit, but it is preferred to keep the user listening fairly close to live play. The Constrained method may be preferable over Newest for channels where tracks may be quite long in duration, such as news/talk channels.

(iii) Real-time—start play with live content. Sports channels are types of channels that can be designated for Real-time Play On Select. Content is still cached in a BIR Buffer to seed the FIR Buffer on channel selection, but initial play on select is from live (iv) Oldest—start play from the oldest cached track that (a) still contains the start of the track in the cache and (b) had not been previously played by the user. This method is used for content where age (and, optionally, order) of the track is of little consequence to the listening experience. Music and comedy channels are types of channels that can be designated for Oldest Play On Select.

When a Smart Favorite™ channel is selected by the user, the channel's BIR Buffer contents effectively replace the FIR Buffer contents (i.e., "seeding" the foreground IR buffer). The radio or device 14 begins playing content from the buffer based on the Play_On_Select method designated for the channel. If the channel BIR Buffer does not contain the start of a track that meets the criteria for playing from a track start as described above, the radio plays live content from the channel. For example, this may be the case within a minute or so after radio power-on or preset bank change, until new starts of tracks begin accumulation in BIR Buffers. When a different channel is selected while tuned to a Smart Favorite™ channel, the most recent portion of the FIR Buffer that can fit into the Smart Favorite™ channel's BIR Buffer is copied over the BIR Buffer, so the radio can continue to maintain an uninterrupted buffer of that channel's content.

Channel Play On Select assignments can be conveyed to the user device or radio receiver 14 in a data service (e.g., along with other metadata supporting features such as bank definitions for channel scanning and scan exclusions), preloaded in the radio receiver, and/or broadcast to the radio receiver, and/or provided by an IP or PC connection, and therefore can be changed in coordination with channel lineup changes.

A default zero configuration mode can be supported, as well as customization options for the user desiring additional control over Tune Start™ operation behaviors. Default configuration supports the Tune Start™ operation for the channels in the currently selected preset bank. The user can be offered a simple, global Tune Start™ operation Enable/

Disable option. If disabled, selecting a preset channel will result in playback of live content on that channel. However, cached content for the preset channel (i.e. up to 10 minutes) is still present for access by Instant Replay controls. Optional configuration (e.g., in a user device 14 Setup function) can allow the user to enable/disable Tune Start™ operation for individual channels in a preset bank, or for individual channels irrespective of their inclusion in any preset bank.

When a channel is not supported for Tune Start™ operation due to higher priority features consuming the receiver's limited channel caching resources, or due to a direct tune to a channel not in the current preset bank, the channel can simply be processed as a channel that does not have any Instant Replay history yet cached. Since the Tune Start™ operation is an extension of Instant Replay, it is not a failure of Tune Start™ operation; rather it is a channel with limited Instant Replay history when selected, and therefore starts play at live. When identifying segments qualified to queue for play from start, the cached content is analyzed to find a segment start based on the following priority order, for example:

a. Segments identified as a song (i.e. PID containing a Song ID).
b. Segments identified as a start of a traffic/weather report (i.e. PID containing first appearance of a Traffic/Weather City ID).
c. Segments identified by a change in PID value (including PID "toggle" bit 31).
d. Segments identified by a change in the Artist string value.
e. Segments identified by a change in Title string value.
f. If no content meets any of the previous criteria (i.e. no change to PID, Artist, or Title for all cached content), queue the live content.

The criteria of Artist change above Title change is in recognition that many channels without managed PID changes may more frequently change Title info (e.g. sports scores, tickers, etc.), while less frequently changing Artist, thereby making Artists more likely to delineate longer "segment" choices. The preceding illustrative criteria optimize the Tune Start™ operation for the content with well-managed logical segment identification, while also providing reasonable benefit for channels where only PAD/PDT changes can be used to determine segments.

When re-selecting a Tune Start operation enabled channel that had been previously selected and the content play position active when the channel was last tuned away is still in the cache, a fresh track is queued or playback from the last position is resumed by the user device 14, depending on the content type and last playback position. For channels designated for Play On Select=Oldest (e.g., Music channels): if there is at least one track (e.g., PID containing a Song ID) cached from the start that had not been previously played (i.e., neither completely nor partially played), play is queued from the oldest such unplayed track in the cache. If, however, there are no unplayed segments cached for the channel, then, in one implementation alternative: if the segment played during the previous selection of this channel was played for at least 10 seconds, for example, during the previous select, play is resumed at the same location last played when the channel was previously tuned away; otherwise, play is started at live. In another implementation alternative, playback resumes at the last play position regardless of previous play duration.

For channels designated for Play On Select=Newest (e.g., News, Talk): if the newest segment in the cache had not been previously played (neither completely nor partially played), play is queued from the start of that newest segment. If, however, the newest segment had previously been played, then in one implementation alternative: if the segment played during the previous selection of this channel was played for at least 10 seconds, for example, during the previous select, play is resumed at the same location last played when the channel was previously tuned away; otherwise, play is started at live; in another implementation alternative, playback always resumes at the last play position regardless of previous play duration.

For channels designated for Play On Select=Real-time (e.g., live Sports), play is preferable always queued from live. The user still has the option of using the IR buttons to go back in the IR buffer if desired.

The radio receiver or user device 14 can maintain a buffer marker of the last play position when the user tuned away from a Tune Start™ channel. On re-selection of that channel, if the play policy selects play from the start of a track (e.g., a newer track has now been buffered) and the last play position is still in the buffer for that channel, the Instant Replay Forward and Rewind controls can be used by the user to conveniently rewind or advance to the last play position, so the user can restore the last play position in the case their true intent was to resume play where they were last listening on that channel.

Tune Scan™ and Channel Scan

A radio receiver or user device 14 can also provide a Tune Scan™ operation that enhances Channel Scan operations. When Channel Scanning, activation of a "Scan" button or similar method by the user causes the radio receiver or user device to cycle through a group of channels, playing a short excerpt (e.g., 5 to 20 seconds) of audio from each channel before advancing to the next channel in the group. When the user hears some content of interest, he halts the scanning operation (e.g., by again pressing a "Scan" button or similar method) at which time the radio receiver or user device 14 continues playing the channel that was being scanned when the scan operation was halted. Such scanning functions are available on radio receiver products such as, for example, AM, FM, SDARS, and HD radios.

Usually a channel scan function will play whatever is being broadcast live for each channel, which typically is in the middle of a track (e.g. song, talk segment, advertisement, etc.). If the user halts scanning, the user continues hearing the track from wherever the track was currently playing live, typically missing the start of that track.

Illustrative embodiments of the present invention provide a Tune Scan™ operation wherein, for each scanned channel enabled as a Tune Start™ channel, the excerpt played from that channel during scanning is played from the start of a track, from its buffered content, instead of from the middle of the live track. Thus, the user is able to hear track excerpts from their start during scanning, making it easier to identify the content available on each channel. Also, when the user halts the scan operation, since the user has heard the start of the track on that channel, they are able to enjoy listening to the full track rather than only a portion of the track.

The methods previously described for selecting which track to play for Tune Start™ channels in response to channel selection can also be applied in selecting which tracks are played from each channel during the Tune Scan™ operation (e.g., from oldest cached track, from newest cached track, or from live, depending on the channel content). In addition, in accordance with one illustrative embodiment, the Tune Scan™ operation can start playing the first excerpt from the oldest un-played cached track among all scanned channels, then next play the next excerpt from the next oldest un-played cached track among all scanned channels, and so forth until all cached channel content has been scanned. In accordance with another illustrative embodiment, excerpts from channels can be played in some fixed order (e.g., the order shown in a preset bank, for example).

The channels scanned during the Tune Scan™ operation can correspond to the channels enabled for Tune Start™ (e.g., the channels in the current preset bank, or user favorites determined using radio-based user content consumption metrics or other group of channels). In accordance with an illustrative embodiment of the present invention, the scanned channels can include a mixture of Tune Start™ enabled channels and channels not enabled for Tune Start™, the latter played with live excerpts when scanned. For example, when a group of channels is scanned, the user device or radio receiver 14 tunes to each of the channels sequentially (e.g., playing an excerpt of content from each channel for a brief time such as 2 to 15 seconds). When the user stops the Tune Scan™ operation, the currently playing channel simply continues playing as the currently tuned channel. In accordance with other illustrative embodiments of the present invention, the user device or radio receiver 14 can perform a variation of the Tune Scan™ operation such as a Channel Scan and/or a Content Scan described below.

More specifically, in accordance with an embodiment of the present invention, the radio receiver or user device 14 provides at least one of two types of scanning, that is, channel scan and Tune Scan™ as further described below: The radio receiver or user device 14 is configured to determine which channels are included during a scan operation, which type of scan is to be performed, the order of the tracks and channels during a scan operation, and the duration of time that content is played back per scan. For example, when a group of channels is scanned, the user device 14 tunes through each of the channels in a cycle, playing an excerpt of content from each channel for several seconds or some other appropriate time interval, for example. The radio receiver 14 automatically plays several seconds from each of a group of channels included in a scan list, repeating until the user stops the scanning. When the user halts the scan operation, the user device 14 stops the scan, and the currently playing channel simply continues playing as the currently tuned channel.

The configuration of the user device 14 to implement Smart Favorite™ enables advantageous features such as Tune Start™ and Tune Scan™. For example, three behaviors and benefits of Smart Favorite™ are:

(1) Multi-channel IR (Instant Replay)—When the user tunes to a Smart Favorite™ channel, the main IR (Instant Replay) buffer is loaded with the contents of a background buffer for the channel, so that previously buffered content for that channel is available to the user as soon as it is tuned.

(2) Tune Start™—When the user tunes to a Smart Favorite™ channel enabled for Tune Start™, the receiver 14 can play the currently playing track for that channel from the track start, so the user can enjoy the full track (e.g., song) rather than joining it live somewhere in the middle of the track.

(3) Tune Scan™—When the user initiates a channel scanning function across any Smart Favorite™ channels (e.g., which are continuously buffered in the background), the receiver 14 can play samples from the start of songs buffered from the scanned channels so the user can enjoy hearing a full song when halting the scan on content of interest; otherwise, the buffered content from the scanned channel can he played according to a Play_On_Select configuration for that channel or type of content.

When a user requests channel scanning via the user device 14, content is played from each scanned channel (e.g., in a selected list of channel(s) being scanned) in succession. If a scanned channel is a Tune Start™ channel, an excerpt from the channel is played based on that channel's Tune Start™ behavior (e.g., Play_On_Select configuration or other behavior configuration) such as playing either the start of the current track or from live. If a scanned channel is not a Smart Favorite™ (or the Tune Start™ feature is disabled by the user), an excerpt from the channel is played from the current live content. Channel Scanning is closest to traditional AM/FM scanning, but with the added benefit of any Smart Favorite™ channels being in the scanned channel list being played from track start, thereby allowing a user to listen to find out what is playing now on each of the scanned channels. In other words, any channels can be included for a Channel Scan.

When a user requests Tune Scan™, tracks or other portions if content deep in Smart Favorite™ channel BIR Buffers are played from track start or other Play_On_Select configuration, for example, thereby potentially playing multiple buffered tracks per channel. This maximizes content available for scanning, while allowing a user to listen to find new content (e.g., a new song), since only Smart Favorite™ channels and the currently tuned channel (FIR buffer) have been included in one illustrative embodiment of a Tune Scan™ operation. As a further example, configuration data (e.g., channel metadata that is pre-configured as a user device default setting, or broadcast or otherwise transmitted) can be established to classify each channel broadly as either "music" or "not music", and Tune Scan™ can be configured to only scan Tune Start channels™ classified as "music" based on this channel metadata.

By way of another illustrative example, the user device 14 is provided with a list of channels to scan (e.g., for a Channel Scan) or a simple request to scan Smart Favorite™ channels (e.g., for a Tune Scan™), along with a parameter indicating play time seconds for each channel. The user device then sequences through the channels playing content and optionally using selected metadata (e.g., Artist/Title) for display during the scanning. If the user selects an advance button (e.g., Fast Forward or Rewind buttons 180 and 176), the user device 14 can skip to a previous or next sample of content from a scanned channel or to the next scanned channel immediately, depending on the scan list and scanning behavior configuration. If the user stops the scan (e.g., either stopping on the currently scanned channel or aborting the scan), the user device 14 stops the scan and tunes to a predetermined channel such as, for example, the channel that was being played at the time the scan was initiated, or, for example, the last channel played during the scan.

As stated above, Multi-channel IR can be, for example, supported by the use of simultaneous buffering of multiple channels (e.g., "Smart Favorite™ channels), along with Tune Start™ and Tune Scan™. It is to be understood that the benefits of the Multi-channel IR functionality (e.g., access to pre-buffered content when tuning a channel) are available independent of the Tune Start™ and Tune Scan™ features. In accordance with an illustrative embodiment of the present invention, when the user tunes to a Smart Favorite™ channel, the BIR (Background Instant Replay) buffer contents for that channel are effectively copied to the FIR (Foreground Instant Replay) buffer. The user can then skip backwards into the buffered contents if desired. When the user tunes away from a Smart Favorite™ channel, as much of the accumulated contents of the FIR buffer that will fit in the channel's BIR buffer can be effectively copied into the BIR buffer. The user device 14 can be configured to automatically delete IR content when a new active channel is tuned. For example, the user device 14 can be configured to not mix content from multiple channels in a single FIR for a currently tuned channel, or BIR buffer for a particular channel.

As stated above in connection with Channel Scan, there are no constraints on how the radio receiver or user device 14 selects channels for a Channel Scan operation. Examples include, but are not limited to, scan all channels in a given Category; scan all channels assigned to a user's "Favorites" list (e.g., preferred content type(s), artist(s) or channel(s)) or Smart Favorite™ channels, scan all channels assigned to the current preset banks, scan all channels assigned to any of the user's preset banks, scan all channels in a "scan list" that the user can specify in a user device setup menu.

The Channel Scan function is intended for use with channels playing any content type. It plays the currently played track on each scanned channel, optionally playing from the start of that track for Tune Start™ channels. Content from each channel is played for a short period of time similar to conventional AM/FM radio scan behaviors. For channels that are not designated as Smart Favorite™ channels, the content played is the live content for that channel. If the Tune Start™ feature has been disabled by the user, the content played for all channels is the live content regardless of whether the channel is a Smart Favorite™ or not. When Tune Start™ is not disabled, the content for Smart Favorite™ channels is played the same as would he played if the user manually selected the channel. Scanning behavior is therefore governed by the afore-mentioned Play_On_Select described below. Like manual channel selection, the selection of play point is influenced by whether the user had recently been tuned to that channel (i.e., where the Last Play Point, if any, for that channel is in the BIR Buffer in relation to other buffered tracks).

By way of an example, for Smart Favorite™ channels designated with Play_On_Select=Newest, the radio receiver or user device 14 plays either:

(1) From the beginning of the newest track in the BIR Buffer (i.e., the track that is still playing live at the time of channel selection), if the Last Play Point for that channel is earlier in the BIR Buffer than the newest track start or is not present in the BIR Buffer (implying user has not heard the newest track); or
(2) From Live, if the Last Play Point for that channel is later in the BIR Buffer than the newest track start (implying that the user has already listened to some of the newest track).

If the scan plays from this channel multiple times while cycling through a scan and is playing from the beginning of the newest track (option #1 above), it continues to play from the same location each scan cycle until and unless a newer track begins to play on that channel, at which time that new track will now be played for each scan pass. In other words, if the newest track for a channel has not changed from scan to scan, then with each scan cycle the user device 14 plays from the start of that same track. If a newer track starts for a channel while still scanning, then this newer track is now the "newest track" and plays from the start for subsequent scan cycles. On the other hand, playing from Live (option #2 above) avoids scanning content already heard (e.g., actively tuned) by the listener. Alternatively, in other exemplary embodiments, the user device 14 can play successive portions of the same track, or successive portions of the same track but starting a defined number of samples prior to the last sample played in the prior scan pass, so that a user does not effectively hear any portion twice.

In addition, for Smart Favorite™ channels designated with Play_On_Select=Constrained, scan play is the same as for the Newest designation for Play_On_Select configuration, except that the start of the newest track is a candidate for play only if it is within 5 minutes or other chosen time interval from the Live content; otherwise, the Live content is played. For Smart Favorite™ channels designated with Play_On_Select=Realtime, current Live content is played during a Channel Scan operation.

Further, channels not currently designated as Smart Favorite™ channels (or Smart Favorite™ channels if the Tune Start™ feature has been globally disabled) will play current Live content during a Channel Scan. The HR Buffer will be flushed as a result of playing that channel during the scan.

In accordance with an illustrative embodiment of the present invention, the currently tuned channel is always included in any Channel Scan, which allows the user to easily halt the scan on the channel he or she was previously listening to. If the Tune Start™ feature is not disabled, the Currently Tuned Channel is treated as if it is a Smart Favorite™ channel during the scan, compliant with its Play_On_Select designation, since it potentially has buffered content in the FIR buffer. At the instant the scan starts, this channel will have a Last Play Point more recent than the start of the currently playing track, but that may change if a new track starts playing on that channel after the scan starts. If the currently tuned channel is also in the scan list (e.g., because it is also one of the current preset bank channels), it is treated as a single member of the scan list (i.e., it is not counted twice in the scan list).

If the user device aborts a scan in progress, the tuned channel at the time the scan started continues to play from Live. Stopping a scan is different from aborting a scan. For example, in accordance with an illustrative embodiment, the user device can be required to support a Scan stop operation, leaving the user playing the last heard channel during the scan. Scan abort, however, can be optionally supported by the user device 14, resumes play from the channel tuned before the scan started.

Tune Scan™ works only with Smart Favorite™ channels and can be implemented primarily for music channels. For Smart Favorite™ channels, it can play excerpts from the start of multiple, older tracks in the channel's BIR Buffer, to assist the user looking for a new song to listen to regardless of whether the song is now playing or was recently played and buffered. With up to 6 channels with around 30 minutes BIR Buffer each, this can provide the user with dozens of songs to scan through. Thus, the user device 14 can optionally be configured to request a Tune Scan™ of Smart Favorite™ channels restricted to Music channels. The user device 14, however, can also include non-Music channels in a Tune Scan™.

For a Tune Scan™ operation, the user device 14 can store a parameter (e.g., (a "PlaySeconds" parameter) to specify a value (e.g., 8 seconds) for play on each channel during Tune Scan™. In accordance with an illustrative embodiment, content from each channel is played for a longer period of time with Tune Scan™ than for Channel Scan to allow the user to hear enough of the content or track portion (e.g., a sample from a song) from its beginning to determine what it is.

Tune Scan™ is not affected by whether the Tune Start™ feature is enabled or disabled. In accordance with an illustrative embodiment of the present invention, when scanning the Smart Favorite™ channels, the radio receiver or user device 14 plays from the start of the oldest track in the channel's BIR Buffer that, for example, 1. still has the start of the track in the channel's buffer,
2. had not been previously played by the user,
3. is newer than the track played the previous scan pass for this channel, and
4. if fully buffered in the BIR Buffer is longer than 45 seconds duration.

If the scan plays from this channel multiple times while cycling through a scan, it advances to the next newest track in the BIR Buffer for each cycle.

If all buffered tracks for this channel are eventually played during scan cycles (e.g., whether from a single repeating scan cycle or multiple scans initiated by the user), the scanning restarts again at the oldest buffered track not previously played by the user, working forward with each scan pass as before. If content has been accumulating for some time (e.g., 15 minutes or more) in the BIR Buffer, this means that the user benefits from hearing excerpts from the starts of multiple songs from that channel during the scan, providing access to a significant amount of content by scanning just a few channels.

For purposes of determining the oldest track that has not been previously played by the user, any track with a Last Play Point within the track and all older tracks are treated as previously played by the user. The Last Play Point for a Smart Favorite™ channel is not reset during scanning unless the user halts the scanning while that channel is tuned.

Each scan pass will play from Live for a channel if (1) the Last Play Point for the channel is later in the BIR Buffer than the newest track start (implies the user has listened to some of the newest track), or (2) there is no track start in the channel's BIR Buffer (e.g., typical shortly after power-up or shortly after changing a Favorites bank), until newer track(s) are buffered for the channel. Thus, a candidate Tune Scan™ channel will not be completely skipped over during Tune Scan™ if there are no suitable track starts for play in the channel's BIR Buffer. At minimum it will play from live for each scan pass.

Tracks fully buffered in the BIR Buffer but shorter than, for example, 45 seconds or other selected duration can be ignored for scan purposes. This provides a means of excluding interstitials from Tune Scan™ if desired in the various illustrative embodiments. This will not exclude playing a short track that is currently playing Live, since there is no method for the radio to determine its length until the next track begins.

The currently tuned channel is potentially included in a Tune Scan™ even if it is not a designated Smart Favorite™ channel, since it is buffered in the FIR Buffer and therefore can be a source of buffered tracks. If the Tune Scan™ is specified as Music-Only, the currently tuned channel is included in the scan only if the channel type designation indicates Music for that channel. If the Tune Scan™ is specified for all Smart Favorite™ channels, then it is always included in the scan. If included in the scan, the currently tuned channel is treated as if it is a Smart Favorite™ channel since it potentially has buffered content in the FIR buffer. The instant the scan starts, this channel will have a Last Play Point more recent than the start of the currently playing track, but that may change if a new track starts playing on that channel after the scan starts. If the currently tuned channel is also in the Tune Scan™ list (e.g., because it is also a designated Smart Favorite™ channel), it is treated as a single member of the scan list (i.e., not counted twice in the scan list). If there are less than two candidate tracks available in all the Tune Scan™ candidates, the user device 14 can, for example, abort the scan with an error message.

During a Tune Scan™ session (i.e., from time the user starts a Scan to the time the Scan is terminated), the radio receiver or user device 14 attempts to play an excerpt from the start of each candidate track once for each scan cycle. Since the scanned channels will have varying numbers of tracks available in their BIR Buffer, the order of channel selection is generally not simple round robin. For example, the radio receiver or user device can use the following criteria to determine which tracks to play as the scan session is started:

1. Play the oldest buffered track from all Smart Favorite™ channels included in the scan (regardless of which channel)
2. Play the next oldest buffered track from all Smart Favorite™ channels included in the scan (regardless of which channel)
3. Repeat step 2 until the newest buffered track from all Smart Favorite™ channels included in the scan is played.
4. Play from the live point for any Smart Favorite™ channels that did not have at least one candidate track.
5. Repeat the cycle starting with 1.

If the scan is aborted, the tuned channel at the time the scan started continues to play from Live.

As stated above, a user benefit of Tune Start™ is to hear a track from its start upon selecting a Smart Favorite™ channel. However, according to some exemplary embodiments of the present invention, different types of content need to be handled differently, so each channel can be designated to observe one of the Play_On_Select behaviors described below:

Newest—Start play from the beginning of the newest track in the BIR Buffer (i.e., the track that is still playing live at the time of channel selection). This is used for content where the user will typically want to hear the most recent content, but it does not need to be strictly real-time (e.g., music channels).

Constrained—Behavior is similar to Newest, except that the start of the newest track in the BIR Buffer is played only if it is within a fixed window (e.g., 5 minutes) from Live; otherwise, play starts with live content. This is used for content where play from track start provides benefit, but it is preferred to keep the user listening fairly close to live play. It may be preferable over Newest for channels where tracks may be quite long in duration such as news/talk channels.

Realtime—Start play with live content, e.g. for a live sports broadcast. Content is still buffered in a BIR Buffer to seed the FIR Buffer on channel selection, but initial play on select is from live.

The Play_On_Select behavior can be pre-configured with the user device 14 or provided dynamically (e.g., through a data service received and processed by the user device).

When a Smart Favorite™ channel is selected by the user and the user device 14 tunes to that channel, the channel's BIR Buffer content effectively replaces the FIR Buffer content (i.e., "seeding" the foreground IR buffer), and the user device 14 begins playing content from the buffer based on the Play_On_Select behavior configuration designated for the channel. When a different channel is selected while tuned to a Smart Favorite™ channel, the most recent portion of the FIR Buffer that can fit into the Smart Favorite™ channel's BIR Buffer is copied over the BIR Buffer, so the radio can continue to maintain an uninterrupted buffer of that Smart Favorite™ channel's content. To facilitate management of the replay buffers, the FIR Buffer can be larger than each of the BIR Buffers.

If the channel BIR Buffer does not contain the start of a track that meets the criteria for playing from a track start as described above, the radio receiver 14 can, for example, play live content from the channel. This will often be the case within a minute or so after radio receiver power-on or a re-assignment of Smart Favorite™ channels due to a preset bank change, until new track starts begin accumulation in BIR Buffers.

In accordance with an illustrative embodiment of the present invention, a broadcast Channel Content Type value for each channel can be used by the user device 14 to classify channels (e.g., as "Music" versus "not Music") for purposes of determining which Smart Favorite™ channels can be candidates for a Tune Scan™. Alternatively, the user device 14 can be configured to analyze Channel_Content_Type metadata for each channel to implement a more sophisticated user interface that determines if there are sufficient channels for scanning before the user invokes a Tune Scan™ function, thereby removing a control if not applicable.

Table 3 provides examples of Channel_Content_Type values.

TABLE 3

Channel Content Type Values

| Content Type | Segment Boundaries | Channel Content Type Value | Value Name (in this document) |
|---|---|---|---|
| Music | By PID | 0 | Music_By_PID |
|  | By Artist/Title | 1 | Music_By_Artist/Title |
| Talk | By PID | 2 | Talk_By_PID |
|  | By Artist/Title | 3 | Talk_By_Artist/Title |
| Live | By PID | 4 | Live_By_PID |
|  | By Artist/Title | 5 | Live_By_Artist/Title |

Channel Content Type classifies the predominant content type and predominant method of marking track (segment) boundaries for each channel, for use in various default behavioral policies for the channel. Channel Content Type is one of the designated configuration values for each channel, indicating the following two classifications:

Content Type:

Music—Channel content is primarily songs.

Talk—Channel Content is primarily non-music, such as talk and/or news.

Live—Channel Content is primarily live content, including sports, concerts, etc.

Segment Boundaries

By PID—Segments are defined by changes in PID values. Typical for Music channels, but also used for certain Talk and Live channels.

By Artist/Title—Segments are defined by changes in Artist/Title.

Illustrative UI 22 Screens and Additional User Device 14 Operations

In accordance with illustrative embodiments of the present invention, the Tune Start™ operation and some additional functions (e.g., Tune Scan™) of a radio receiver or user device 14 will now be described with reference to FIGS. 10-12. Further, an example function referred to as "Featured Favorites" is illustrated wherein preset banks are defined and broadcast (e.g., by an SDARS provider). With Featured Favorites, a content provider such as an SDARS broadcaster, for example, can dynamically define sets of channel preset banks from multiple categories to help the user explore new and related content, for example banks of holiday channels, artist channels, easy listening channels, and celebrity channels (e.g., "Howards favorites"), and the like.

Figure 10:
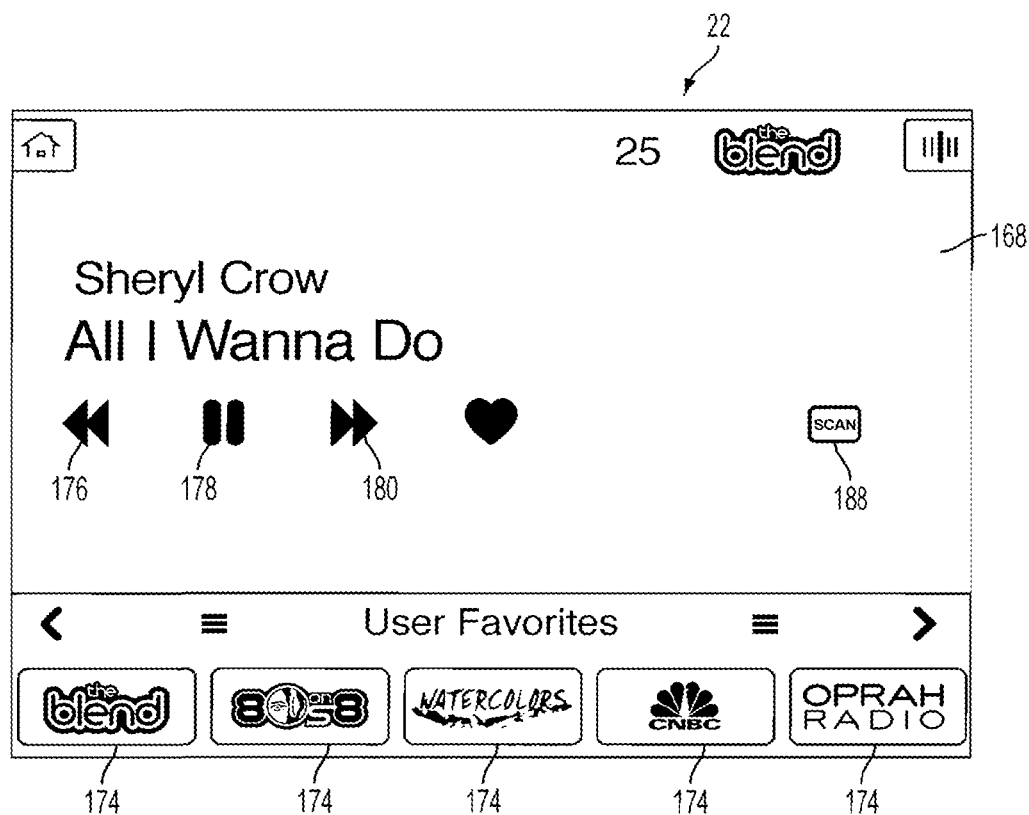
Figure 11:

FIG. 10 is an illustrative radio receiver or user device 14 having a UI 22 and exemplary screen 168 showing the track that is currently playing and providing a user with other controls (e.g., IR controls 176 or 178 to pause or rewind the live channel, and user favorites buttons 174, among others.

To commence an operation such as Featured Favorites, the radio receiver or user device 14 can automatically designate the channels in the active preset hank (e.g., User Favorites) as Tune Start™ channels, or can provide a Smart Favorites enable/disable button. By way of an example, the radio receiver 14 starts playing Channel 25 (The Blend) and Sheryl Crow—All I Wanna Do (FIG. 10) is playing and likely from well within that song. If the user selects 80s on 8 from the presets, the song playing on that channel (e.g., Rolling Stones—Emotional Rescue as seen in the UI screen depicted in FIG. 11) starts playing from the start of that song. As described above, to achieve this operation, radio receivers or user devices 14 can be provided with multi-channel reception. Similar to the Instant Replay operation, which caches the received live content of the currently tuned channel into a RAM buffer to allow a user to pause and resume playback, the Featured Favorites operation supports multiple preset channels in addition to the currently tuned channel, so content is ready for playback when a user changes to a preset channel. Moreover, the radio receiver or user device 14 is programmed to start at the beginning of songs and segments when a user changes to a preset (e.g., uses PAD/PID to locate the beginnings of cached segments).

A content provider such as a SDARS broadcaster can configure, for example, through an over the air broadcast or via two-way IP, the Smart Favorites rules for each channel so that the radio receivers or user devices 14 start from the beginning of songs for music channels, the most recent content segment for talk, and automatically go to live for very time-sensitive content like live sports play, for example.

Also, once selected, any of these channels benefit from traditional Instant Replay buffering, with the additional advantage that the Instant Replay buffer is "seeded" with the previously cached content for the selected channel.

Further, tuning speed is optimal as compared to other content selection technologies. Since the content for the preset channels is being constantly received and cached in parallel, changing channels is instantaneous. This is not the case with conventional streaming services, which typically can receive only one channel at a time. With streaming, there is usually a significant restart delay every time a user changes a channel. However, it is understood that a radio receiver 14 based on streaming services (e.g., a radio receiver capable of receiving streamed SDARS content such as via two-way IP) could be equipped to stream and buffer multiple channels simultaneously and thereby benefit from the capabilities and advantages provided by the present invention.

As stated above, a user can define his own preset banks consisting of his favorite channels. However, a content provider, for example, can also define banks of presets that include related channels (e.g., Featured Favorites) and broadcast them to the radio receivers 14. Pressing the Favorites bar on the current Now Playing screen (FIG. 11) produces a list of Favorites (preset) banks 184 while audio continues playing. For example, one use case addresses a common issue during the December holiday season. During this time, SDARS providers produce a number of holiday channels, for example, traditional Christmas music, country Christmas music, a Hanukkah channel, a classical holiday music channel, and so forth. SDARS listeners enjoy this content but a common complaint is not being able to find these temporary channels since they are spread out across the lineup in multiple categories generally. With Featured Favorites, a provider can define a preset bank called "Holiday Music" that groups all of these channels together, appearing in the list of preset banks only during December. If a user selects Holiday Music, she will see these channels and can easily tune to any of them.

Other uses for Featured Favorites might be a single bank 184 to find temporary and long-term Artist Channels such as, for example, channels dedicated to Pearl Jam, McCartney, Springsteen, Elvis, and so forth. Alternatively, a bank 184 might include a collection of Easy Listening channels from multiple categories, jazz, pop, classical, country, to make it easy to find something if a user is interested in that kind of mood. In addition, "celebrity" banks 184 can be provided that cater to the Howard Stern, Martha Stewart, or Oprah fan. These banks 184 can be defined dynamically, broadcasting their definitions to radio receivers, so they can be added, deleted, and modified at any time. As an example of a Rock-oriented bank, "Rock Essentials" can be selected from the list of banks depicted in FIG. 12, which enables a user device 14 to generate a Now Playing screen showing a bank or 10 rock preset channels as shown in the screen depicted in FIG. 12.

The metadata provided for each Featured Favorites bank can include, but is not limited to, title of the bank; description of the bank contents and/or purpose; imagery associated with the bank (e.g., a logo); specifications that indicate the radio receiver capabilities required for displaying a particular bank (e.g., range of number of displayable channels in the radio receiver's preset bank required to be allowed to display the bank, and/or channels or channel groups that must be tunable by the radio receiver to be allowed to display the bank), priority of the bank (e.g., which banks should be displayed to the user if the radio receiver is capable of displaying a limited set of preset banks); and duration of the hank (e.g., allowable start and/or stop dates to display the bank to the user).

Figure 12:
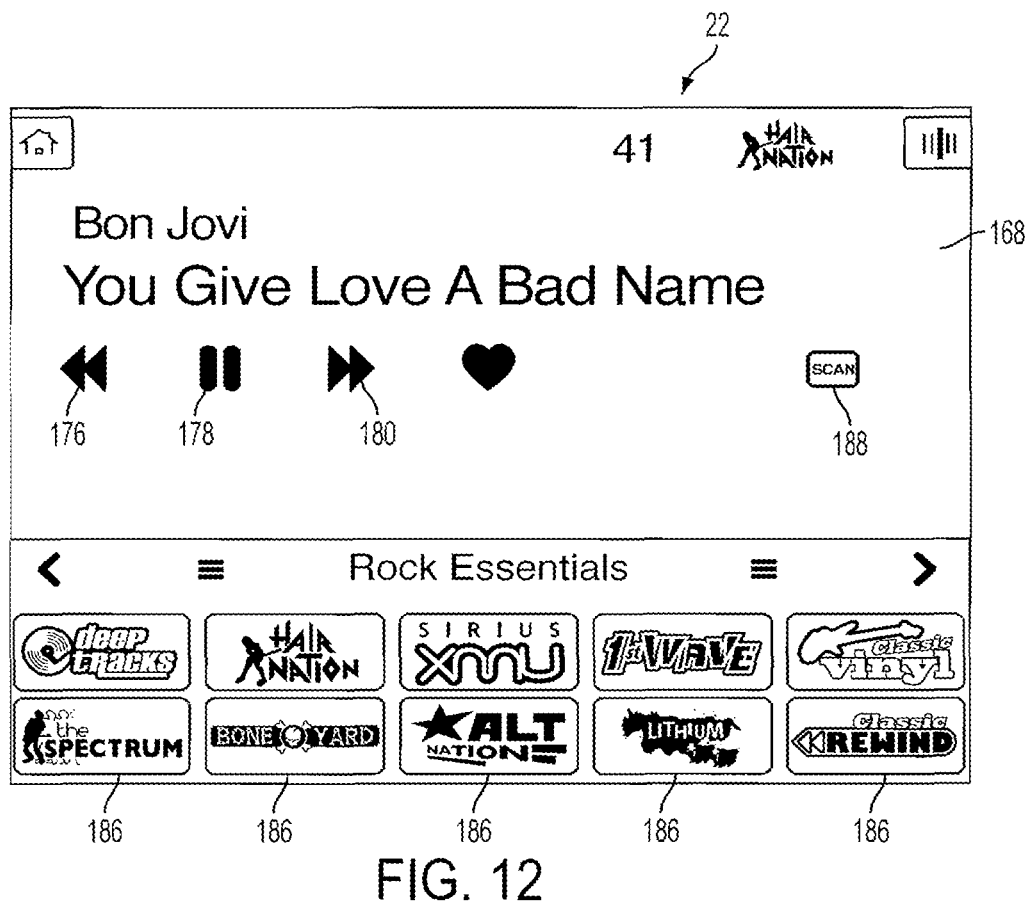

With continued reference to FIG. 12, the Scan button 188 can be pressed (e.g., which can highlight in blue or other color to indicate Scan is active). As described above, the groups of channels that are scanned can be user configurable, automatically configurable, dynamically configurable, or preset (e.g., present banks, content-specific, and the like). The radio receiver or user device 14 then plays content from the channels in a predefined or dynamically calculated order that simulates picking a buffered track from each channel. Each time a song or other content from a channel is played, the button 186 for that channel can be configured to glow slightly, and the Artist, Title, channel number, and channel logos corresponding to the currently scanned track are updated accordingly in the display area 168. Content in each scanned track by default plays for a selected brief duration before skipping to the next song or other track. Thus, a user can hear a track such as a song from each of the scanned channels from its beginning, for example, instead of from somewhere in the middle of the song like typical scan behavior in existing devices. As described above, some channels designated as Smart Favorite™ channels can be configured to playback based on Play_On_Select parameters (e.g., beginning, constrained, or live or real-time). The artist and title information corresponding to the currently scanned track can be displayed. Further, the user can press the Fast Forward button 180 or Rewind button 176 if he or she wants to, respectively, fast forward or rewind the currently playing sample of the scanned channel, or skip to the next track sample sooner or return to a previous track sample. The buttons 180 and 176 can be continuously depressed for fast forward and rewind operations within a sample, and iteratively depressed to skip forward or backward among samples of tracks of scanned channels. If the radio receiver 14 is in a car and the user's car is equipped with an Up/Down button on the steering wheel that is configured to allow channel changes, the preset scan operation provides a very useful and undistracted method for searching for content.

Illustrative embodiments of the present invention have been described with reference to a radio receiver or other user device 14 having firmware and/or program code. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices. It is envisioned that aspects of the present invention can be embodied as carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

The above-presented description and figures are intended by way of example only and are not intended to limit the present invention in any way except as set forth in the following claims. It is particularly noted that persons skilled in the art can readily combine the various technical aspects of the various elements of the various exemplary embodiments that have been described above in numerous other ways, all of which are considered to be within the scope of the invention.

What is claimed is:

1. A system for enhanced playback of content, the system comprising:
   a broadcast device; and
   a computing device configured to:
      receive, from the broadcast device, a plurality of program channels from at least one content stream;
      designate one or more of the plurality of program channels as designated channels;
      store at least a currently received program and one or more older programs associated with each of the designated channels in a buffer; and
      in response to receiving a command to initiate a scan function, scanning at least a subset of the plurality of program channels by:
         playing a portion of an oldest program in each of the designated channels from a playback point that corresponds to a start of the oldest program; and
         successively playing a portion of a next oldest program in each of the designated channels until at least a portion of the currently received program in each of the designated channels is played.

2. The system of claim 1, wherein the computing device is further configured to:
receive metadata indicative of content type for each of the plurality of program channels;
receive a user input indicative of selection of a first channel of the plurality of program channels;
determine, based on the content type, whether the first channel transmits time sensitive content;
if the first channel does not transmit time sensitive content, selecting a playback point for the first channel that is different than a current play point for the first channel as received in real-time; and
if the first channel transmits time sensitive content, selecting a playback point for the first channel that corresponds to a current play point in the real-time reception of the first channel.

3. The system of claim 2, wherein the computing device is further configured to:
perform at least one of the following in response to user input:
rewind, pause, fast forward, or skip to the beginning of a currently received program or to a preceding program stored in the buffer.

4. The system of claim 2, wherein the computing device is further configured to:
determine that the first channel is not one of the designated channels; and
play content of the first channel as that content is received, wherein
the receiving comprises receiving the at least one content stream from at least one of a wireless transmission, a wireline transmission, a radio program communication, a television program communication, a cable television programming communication, streaming via the internet, digital audio broadcast (DAB), a unicast, a multicast, a broadcast a cellular communication, and a satellite communication.

5. The system of claim 1, wherein the computing device is further configured to:
receive a user input to stop the scan function;
perform a channel change to a different channel of the plurality of channels; and
automatically select a playback point for a program of the different channel based on one or more of:
(i) type of content playing on the different channel, (ii) type of the different channel, (iii) natural transition point of content of the different channel, (iv) a look-up table, (v) user designation, (vi) time of receipt of content of the different channel, or (vi) received data associated with the different channel.

6. The system of claim 5, wherein the computing device is further configured to:
in response to a user input, perform a second channel change from the different channel to a second different channel;
play the second different channel to a user;
detect a return command to change from the second different channel back to the different channel;
determine a return point for content of the different channel that is stored in the buffer based on a type of content associated with the different channel and a specified return configuration for the different channel; and
play back content of the different channel from the return point.

7. The system of claim 1, wherein each program of the one or more older programs of the plurality of program channels is a track, and wherein the playing the portion of the oldest program is associated with a playback point that corresponds to a beginning of an oldest track.

8. The system of claim 1, wherein each of the plurality of program channels comprises at least two different types of content selected from the group consisting of: audio, metadata, video, images, alphanumeric information, graphical information, analog information, and digital information, the method further comprising playing back different types of content depending on the then tuned channel and storing different types of content in the buffer as a function of the type of content received on a designated channel.

9. The system of claim 1, wherein the computing device is further configured to:
store content associated with any non-designated program channel currently tuned as the content is received; and
play back at least a portion of select tracks of the content in response to user instruction while continuing to buffer the non-designated program channel, the user instruction including a skip track forward operation or a skip track backward operation, the method further comprising limiting a user to a selected number of skip track operations depending on navigation restrictions set for the non-designated program channel.

10. A system for enhanced playback of content, the system comprising:
a broadcast device; and
a computing device configured to:
receive, from a broadcast device, a plurality of program channels from at least one content stream;
designate one or more of the plurality of program channels as designated channels;
store at least an oldest program and a next oldest program, associated with each of the designated channels, in a buffer;
receive a user input to initiate a scan function; and
in response to the user input, scanning at least a subset of the designated channels by successively playing a selected amount of content for each designated channel in the subset,
wherein the successively playing the selected amount of the content includes playing a portion of an oldest program in each of the designated channels and playing a portion of a next oldest program in each of the designated channels until at least a portion of a newest buffered program in each of the designated channels is played.

11. The system of claim 10, wherein:
each program of the at least one program of each channel in the subset is a track, and wherein at least one playback point for the successively playing the selected amount of the content is determined based on configuration data provided for a corresponding designated channel; or
for each channel in the subset that is not one of the designated channels, playing the selected amount of content for that channel is affected by playing a selected amount of the live content of that channel.

12. The system of claim 10, wherein each program of the at least one program of each channel in the subset is a track, and wherein the playback point for at least one of the programs being played back corresponds to one of:

(i) the start of the newest track fully stored in the buffer for the corresponding channel,
(ii) the start of the currently received track for the corresponding channel, or
(iii) either (a) the start of the newest track fully stored in the buffer for the corresponding channel if the start of that track is within a selected time interval of the current play point for that channel, or (b) the current play point for that corresponding channel.

13. The system of claim 10, wherein the designated channels comprise at least one of:
(i) channels that provide a defined category of content,
(ii) channels designated as preset channels,
(iii) channels designated in banks of preset channels,
(iv) channels providing content that satisfies a user preference, or
(v) channels listed on a personalized scan list.

14. The system of claim 13 wherein the:
(i) channels that provide a defined category of content,
(iv) channels providing content that satisfies a user preference, and
(v) channels listed on a personalized scan list, are defined by at least one of:
(a) data associated with the content stream received,
(b) user designations and selections, or
(c) user preferences inferred from user behavior.

* * * * *